(12) United States Patent
Thakur et al.

(10) Patent No.: US 7,797,395 B1
(45) Date of Patent: *Sep. 14, 2010

(54) ASSIGNMENT OF DATA FLOWS TO STORAGE SYSTEMS IN A DATA STORAGE INFRASTRUCTURE FOR A COMMUNICATION NETWORK

(75) Inventors: Brajendra Singh Thakur, Overland Park, KS (US); Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1085 days.

This patent is subject to a terminal disclaimer.

(21) Appl. No.: 11/335,354

(22) Filed: Jan. 19, 2006

(51) Int. Cl.
  *G06F 12/00* (2006.01)
  *H04L 29/00* (2006.01)
(52) U.S. Cl. .................... 709/216; 370/229; 370/230; 370/235; 726/4; 707/200; 714/20; 714/57
(58) Field of Classification Search ......... 709/223–225, 709/238, 217–219; 726/4; 370/229–230, 370/235; 707/200; 714/20, 57
See application file for complete search history.

(56) References Cited

U.S. PATENT DOCUMENTS

| | | | |
|---|---|---|---|
| 5,287,500 A * | 2/1994 | Stoppani, Jr. ............. | 711/211 |
| 5,500,934 A | 3/1996 | Austin et al. | |
| 5,765,140 A | 6/1998 | Knudson et al. | |
| 5,958,012 A | 9/1999 | Battat et al. | |
| 6,031,528 A | 2/2000 | Langfahl, Jr. | |
| 6,046,980 A | 4/2000 | Packer | |
| 6,086,618 A | 7/2000 | Al-Hilali et al. | |
| 6,088,816 A | 7/2000 | Nouri et al. | |
| 6,128,016 A | 10/2000 | Coelho et al. | |
| 6,173,311 B1 | 1/2001 | Hassett et al. | |
| 6,253,240 B1 | 6/2001 | Axberg et al. | |
| 6,345,239 B1 | 2/2002 | Bowman-Amuah | |
| 6,346,954 B1 | 2/2002 | Chu et al. | |
| 6,370,573 B1 | 4/2002 | Bowman-Amuah | |
| 6,405,364 B1 | 6/2002 | Bowman-Amuah | |
| 6,427,132 B1 | 7/2002 | Bowman-Amuah | |
| 6,434,568 B1 | 8/2002 | Bowman-Amuah | |
| 6,460,082 B1 | 10/2002 | Lumelsky et al. | |

(Continued)

FOREIGN PATENT DOCUMENTS

JP 07192006 A * 7/1995

OTHER PUBLICATIONS

Kinsfather—J, McCloy—M.;The NOAA virtual data system. Improving access to and management of federal environmental data. ;19990000.;IEEE, Piscataway, NJ, USA.;2000012.;p. 52-8, 5 refs, pp. vii+276, I.*

(Continued)

*Primary Examiner*—Ashok B Patel
*Assistant Examiner*—Evans Desrosiers

(57) ABSTRACT

A data storage infrastructure is disclosed for a communication network that produces a plurality of data flows of network data. The data storage infrastructure comprises a plurality of data storage systems and a storage management system. The data storage systems are configured to store the network data using a plurality of data storage service classes, wherein different ones of the data storage systems provide different ones of the data storage service classes. The storage management system is configured to process characteristics for the data flows to assign individual ones of the data flows to individual ones of the data storage systems.

20 Claims, 26 Drawing Sheets

U.S. PATENT DOCUMENTS

| | | | |
|---|---|---|---|
| 6,538,669 B1 | 3/2003 | Lagueux, Jr. et al. | |
| 6,611,867 B1 | 8/2003 | Bowman-Amuah | |
| 6,636,250 B1 | 10/2003 | Gasser | |
| 6,670,973 B1 | 12/2003 | Hill et al. | |
| 6,684,191 B1 | 1/2004 | Barnard et al. | |
| 6,721,795 B1 | 4/2004 | Eldreth | |
| 6,769,022 B1 | 7/2004 | DeKoning et al. | |
| 6,782,421 B1 | 8/2004 | Soles et al. | |
| 6,832,248 B1 | 12/2004 | Byrnes | |
| 6,889,196 B1 | 5/2005 | Clark | |
| 6,938,027 B1 | 8/2005 | Barritz et al. | |
| 6,944,654 B1 | 9/2005 | Murphy et al. | |
| 6,952,698 B2 | 10/2005 | Delaire et al. | |
| 6,988,087 B2 | 1/2006 | Kanai et al. | |
| 7,020,621 B1 | 3/2006 | Feria et al. | |
| 7,035,900 B2 | 4/2006 | Yamaguchi et al. | |
| 7,069,337 B2 | 6/2006 | Rawlins et al. | |
| 7,103,731 B2 | 9/2006 | Gibble et al. | |
| 7,120,694 B2 | 10/2006 | Sinha | |
| 7,139,999 B2 | 11/2006 | Bowman-Amuah | |
| 7,145,898 B1 | 12/2006 | Elliott | |
| 7,171,624 B2 | 1/2007 | Baldwin et al. | |
| 7,177,883 B2 | 2/2007 | Yagawa | |
| 7,188,317 B1 | 3/2007 | Hazel | |
| 7,194,538 B1 | 3/2007 | Rabe et al. | |
| 7,209,439 B2 | 4/2007 | Rawlins et al. | |
| 7,222,269 B2 | 5/2007 | Kurinami et al. | |
| 7,225,211 B1 | 5/2007 | Colgrove et al. | |
| 7,228,306 B1 | 6/2007 | Altman et al. | |
| 7,269,612 B2 | 9/2007 | Devarakonda et al. | |
| 7,305,392 B1 | 12/2007 | Abrams et al. | |
| 7,340,505 B2 | 3/2008 | Lisiecki et al. | |
| 7,340,646 B2 | 3/2008 | Haustein et al. | |
| 7,386,585 B2 | 6/2008 | Agrawal et al. | |
| 7,409,521 B2 | 8/2008 | Umeda | |
| 7,415,509 B1 | 8/2008 | Kaltenmark et al. | |
| 7,430,513 B2 | 9/2008 | Kirkland et al. | |
| 7,447,729 B1 | 11/2008 | Thakur et al. | |
| 7,457,870 B1 | 11/2008 | Lownsbrough et al. | |
| 7,461,231 B2 | 12/2008 | Branda et al. | |
| 7,474,940 B2 | 1/2009 | Basham et al. | |
| 7,480,734 B1 | 1/2009 | Thakur et al. | |
| 7,562,029 B2 | 7/2009 | Majd et al. | |
| 7,599,922 B1 | 10/2009 | Chen et al. | |
| 2001/0004520 A1 | 6/2001 | Nomoto et al. | |
| 2002/0087635 A1 | 7/2002 | Yamaguchi et al. | |
| 2002/0124086 A1* | 9/2002 | Mar | 709/226 |
| 2002/0152181 A1 | 10/2002 | Kanai et al. | |
| 2002/0152305 A1 | 10/2002 | Jackson et al. | |
| 2002/0165961 A1 | 11/2002 | Everdell et al. | |
| 2002/0169658 A1 | 11/2002 | Adler | |
| 2002/0194369 A1* | 12/2002 | Rawlins et al. | 709/238 |
| 2003/0033226 A1 | 2/2003 | Anderson | |
| 2003/0037187 A1 | 2/2003 | Hinton et al. | |
| 2003/0055735 A1 | 3/2003 | Cameron et al. | |
| 2003/0146929 A1 | 8/2003 | Baldwin et al. | |
| 2003/0172145 A1 | 9/2003 | Nguyen | |
| 2003/0225801 A1 | 12/2003 | Devarakonda et al. | |
| 2004/0030563 A1 | 2/2004 | Porcari et al. | |
| 2004/0039891 A1 | 2/2004 | Leung et al. | |
| 2004/0054545 A1 | 3/2004 | Knight | |
| 2004/0064349 A1 | 4/2004 | Humenansky et al. | |
| 2004/0093289 A1 | 5/2004 | Bodin | |
| 2004/0136379 A1 | 7/2004 | Liao et al. | |
| 2004/0143507 A1 | 7/2004 | Chen et al. | |
| 2004/0157624 A1 | 8/2004 | Hrastar | |
| 2004/0215545 A1 | 10/2004 | Murakami et al. | |
| 2004/0216131 A1 | 10/2004 | Robison | |
| 2004/0267611 A1 | 12/2004 | Hoerenz | |
| 2005/0021384 A1 | 1/2005 | Pantaleo et al. | |
| 2005/0021429 A1 | 1/2005 | Bates | |
| 2005/0033624 A1 | 2/2005 | Dixon | |
| 2005/0038915 A1* | 2/2005 | Clarke et al. | 709/250 |
| 2005/0080696 A1 | 4/2005 | Bagchi et al. | |
| 2005/0097506 A1 | 5/2005 | Heumesser | |
| 2005/0108582 A1 | 5/2005 | Fung | |
| 2005/0137922 A1 | 6/2005 | Blackwood et al. | |
| 2005/0138170 A1 | 6/2005 | Cherkasova et al. | |
| 2005/0188087 A1 | 8/2005 | Iyoda | |
| 2005/0193128 A1 | 9/2005 | Dawson et al. | |
| 2005/0235252 A1 | 10/2005 | Knight | |
| 2006/0004540 A1 | 1/2006 | Hamilton et al. | |
| 2006/0025985 A1 | 2/2006 | Vinberg et al. | |
| 2006/0036820 A1 | 2/2006 | Ejiri et al. | |
| 2006/0059253 A1 | 3/2006 | Goodman et al. | |
| 2006/0206512 A1 | 9/2006 | Hanrahan et al. | |
| 2006/0206671 A1 | 9/2006 | Aiello et al. | |
| 2006/0230086 A1 | 10/2006 | Devarakonda et al. | |
| 2006/0253678 A1* | 11/2006 | Gusler et al. | 711/170 |
| 2006/0294151 A1* | 12/2006 | Wong et al. | 707/200 |
| 2007/0073576 A1 | 3/2007 | Connors et al. | |
| 2007/0094375 A1 | 4/2007 | Snyder et al. | |
| 2007/0100714 A1 | 5/2007 | Walker | |
| 2007/0244939 A1 | 10/2007 | Devarakonda et al. | |
| 2007/0244940 A1 | 10/2007 | Devarakonda et al. | |
| 2008/0015955 A1 | 1/2008 | Ehrman et al. | |
| 2008/0151923 A1 | 6/2008 | Ignatowski et al. | |
| 2008/0262991 A1 | 10/2008 | Kapoor et al. | |
| 2009/0204693 A1 | 8/2009 | Andreev et al. | |

OTHER PUBLICATIONS

Richard Harrison, "CDIA Training & Test Preparation Guide," 2000, 3 pages, Specialized Solutions, Inc., Tarpon Springs, Florida.

John Chung-I Chuang, et al., "Distributed Network Storage with Quality-of-service Guarantees," Proceedings of the Internet Society INET 99 Conference, Jun. 1999, 27 pages, U.S.A.

"The Cost Benefits of an iSCSI SAN: An Analysis of Total Cost of Ownership (TCO) Compared to a Fibre Channel SAN and to Direct-Attached Storage," Server Storage White Paper, Dec. 2003, pp. 1-4, Adaptec Inc., U.S.A.

Paul Hilton, "Assessing the Cost/Benefit Ratio for Storage Quotas," Mar. 26, 2002, pp. 1-8, searchstorage.com, http://searchstorage.techtarget.com/tip/0,289483,sid5_gci812453,00.html.

* cited by examiner

| STORAGE SERVICES | CURRENTLY DELIVERED | PRIMARY ORG. | CURRENT HOURS | TARGET HOURS | SECONDARY ORG. | CURRENT HOURS | TARGET HOURS | PERSONNEL GAP |
|---|---|---|---|---|---|---|---|---|
| ARCHITECTURE DESIGN | | | | | | | | |
| ASSET MANAGEMENT | | | | | | | | |
| BACKUP | | | | | | | | |
| BILLING | | | | | | | | |
| CAPACITY MANAGEMENT | | | | | | | | |
| CHANGE MANAGEMENT | | | | | | | | |
| CONFIGURATION MANAGEMENT | | | | | | | | |
| DATA MOVEMENT | | | | | | | | |
| CUSTOMER RELATIONSHIP | | | | | | | | |
| DISASTER RECOVERY | | | | | | | | |
| LIFECYCLE MANAGEMENT | | | | | | | | |
| PROBLEM MANAGEMENT | | | | | | | | |
| MONITORING | | | | | | | | |
| PERFORMANCE MANAGEMENT | | | | | | | | |
| PROCUREMENT | | | | | | | | |
| PROVISIONING | | | | | | | | |
| REPLICATION | | | | | | | | |
| REPORTING | | | | | | | | |
| RESTORATION | | | | | | | | |
| TOTALS | | | | | | | | |

GUI 700

FIGURE 7

| STORAGE SERVICES | PROCESS EXISTS | PRIMARY PROCESS OWNER | SECONDARY PROCESS OWNER | PRIMARY USER | SECONDARY USER | CURRENT MATURITY LEVEL | TARGET MATURITY LEVEL | PROCESS GAP |
|---|---|---|---|---|---|---|---|---|
| ARCHITECTURE DESIGN | | | | | | | | |
| ASSET MANAGEMENT | | | | | | | | |
| BACKUP | | | | | | | | |
| BILLING | | | | | | | | |
| CAPACITY MANAGEMENT | | | | | | | | |
| CHANGE MANAGEMENT | | | | | | | | |
| CONFIGURATION MANAGEMENT | | | | | | | | |
| DATA MOVEMENT | | | | | | | | |
| CUSTOMER RELATIONSHIP | | | | | | | | |
| DISASTER RECOVERY | | | | | | | | |
| LIFECYCLE MANAGEMENT | | | | | | | | |
| PROBLEM MANAGEMENT | | | | | | | | |
| MONITORING | | | | | | | | |
| PERFORMANCE MANAGEMENT | | | | | | | | |
| PROCUREMENT | | | | | | | | |
| PROVISIONING | | | | | | | | |
| REPLICATION | | | | | | | | |
| REPORTING | | | | | | | | |
| RESTORATION | | | | | | | | |

GUI 800

FIGURE 8

| STORAGE SERVICES | EXISTING HARDWARE & VENDOR | EXISTING SOFTWARE & VENDOR | EXISTING EXTERNAL SERVICES | GAPS | HARDWARE TO PURCHASE | SOFTWARE TO PURCHASE | EXTERNAL SERVICES TO PURCHASE |
|---|---|---|---|---|---|---|---|
| ARCHITECTURE DESIGN | | | | | | | |
| ASSET MANAGEMENT | | | | | | | |
| BACKUP | | | | | | | |
| BILLING | | | | | | | |
| CAPACITY MANAGEMENT | | | | | | | |
| CHANGE MANAGEMENT | | | | | | | |
| CONFIGURATION MANAGEMENT | | | | | | | |
| DATA MOVEMENT | | | | | | | |
| CUSTOMER RELATIONSHIP | | | | | | | |
| DISASTER RECOVERY | | | | | | | |
| LIFECYCLE MANAGEMENT | | | | | | | |
| PROBLEM MANAGEMENT | | | | | | | |
| MONITORING | | | | | | | |
| PERFORMANCE MANAGEMENT | | | | | | | |
| PROCUREMENT | | | | | | | |
| PROVISIONING | | | | | | | |
| REPLICATION | | | | | | | |
| REPORTING | | | | | | | |
| RESTORATION | | | | | | | |

GUI 900

FIGURE 9

| COST PARAMETERS | COMPUTER SYSTEM 1 | COMPUTER SYSTEM N | STORAGE SYSTEM 1 | STORAGE SYSTEM N |
|---|---|---|---|---|
| FULL TIME EMPLOYEE (FTE) COSTS | | | | |
| NUMBER OF PRIMARY FTES | | | | |
| ANNUAL COST PER PRIMARY FTE | | | | |
| NUMBER OF SECONDARY FTES | | | | |
| ANNUAL COST PER SECONDARY FTE | | | | |
| ADDITIONAL FTE COST | | | | |
| SERVICE CONTRACT COSTS | | | | |
| % STORAGE COST FOR FTES | | | | |
| SERVER COSTS | | | | |
| NUMBER OF SERVERS | | | | |
| AVERAGE COST OF SMALL SERVER | | | | |
| AVERAGE COST OF MEDIUM SERVER | | | | |
| AVERAGE COST OF LARGE SERVER | | | | |
| % OF SMALL SERVERS | | | | |
| % OF MEDIUM SERVERS | | | | |
| % OF LARGE SERVERS | | | | |
| ESTIMATE % SERVERS SAVED BY CONSOLIDATION | | | | |
| NUMBER OF YEARS FOR SERVER AMORTIZATION | | | | |
| % OF SERVER COST NOT FOR INTERNAL DISKS | | | | |
| % STORAGE COST FOR SERVERS | | | | |
| INTERNAL DISK COSTS | | | | |
| TOTAL COST OF INTERNAL DISKS | | | | |
| TOTAL DATA CAPACITY OF INTERNAL DISKS | | | | |
| AVAILABLE DATA CAPACITY OF INTERNAL DISKS | | | | |
| PURCHASED BUT UNINSTALLED CAPACITY | | | | |
| % STORAGE COST FOR INTERNAL DISKS | | | | |

GUI 1000

FIGURE 10

| COST PARAMETERS | COMPUTER SYSTEM 1 | COMPUTER SYSTEM N | STORAGE SYSTEM 1 | STORAGE SYSTEM N |
|---|---|---|---|---|
| EXTERNAL DISK COSTS | | | | |
| TOTAL DATA CAPACITY OF EXTERNAL DISKS | | | | |
| AVAILABLE DATA CAPACITY OF EXTERNAL DISKS | | | | |
| PURCHASED BUT UNINSTALLED CAPACITY | | | | |
| NUMBER OF YEARS OF EXTERNAL DISK AMORTIZATION | | | | |
| ANNUAL DISK CONFIGURATION FEES | | | | |
| ANNUAL DISK MAINTENANCE FEES | | | | |
| ANNUAL COST PER GB FOR EXTERNAL DISKS | | | | |
| % STORAGE COST FOR EXTERNAL DISKS | | | | |
| TAPE COSTS | | | | |
| % OF TAPE CAPACITY IN USE | | | | |
| NUMBER OF TAPE DRIVES | | | | |
| NUMBER OF TAPE LIBRARIES | | | | |
| AVERAGE CAPACITY OF TAPE CARTRIDGES | | | | |
| NUMBER OF TAPE CARTRIDGES | | | | |
| ANNUAL TAPE HARDWARE COST | | | | |
| ANNUAL TAPE VAULTING COST | | | | |
| ANNUAL TAPE MEDIA COST | | | | |
| NUMBER OF YEARS FOR TAPE SYSTEM AMORTIZATION | | | | |
| % STORAGE COST FOR TAPE SYSTEMS | | | | |
| NETWORKING COSTS | | | | |
| TOTAL COM. NETWORK COST | | | | |
| % OF COM. NETWORK USED FOR STORAGE | | | | |
| AMOUNT OF DATA BACKED-UP PER DAY | | | | |
| BACK-UP WINDOW MET | | | | |
| RESTORATION MEETING SLA'S | | | | |
| NETWORKING COST PER UNIT STORAGE | | | | |
| % STORAGE COST FOR NETWORKING | | | | |

GUI 1000

FIGURE 11

| COST PARAMETERS | COMPUTER SYSTEM 1 | COMPUTER SYSTEM N | STORAGE SYSTEM 1 | STORAGE SYSTEM N |
|---|---|---|---|---|
| SOFTWARE COSTS | | | | |
| AVERAGE ANNUAL COST OF SOFTWARE FOR DISKS | | | | |
| AVERAGE ANNUAL COST OF SOFTWARE FOR TAPE | | | | |
| AVERAGE ANNUAL COST OF SOFTWARE FOR SERVERS | | | | |
| % STORAGE COST FOR SOFTWARE | | | | |
| ADDITIONAL EQUIPMENT COST | | | | |
| ANNUAL SAN EQUIPMENT COST | | | | |
| ANNUAL NETWORK HARDWARE COST | | | | |
| ANNUAL TELECOMMUNICATIONS COST | | | | |
| ANNUAL INFRASTRUCTURE COST | | | | |
| OTHER STORAGE EQUIPMENT COST | | | | |
| % STORAGE COST FOR ADDITIONAL EQUIPMENT | | | | |
| ENVIRONMENTAL COSTS | | | | |
| ANNUAL ENVIRONMENTAL COST | | | | |
| ANNUAL MISCELLANEOUS ENVIRONMENTAL COST | | | | |
| ANNUAL BUSINESS CONTINUITY COST | | | | |
| % OF STORAGE COST FOR ENVIRONMENTAL | | | | |
| OUTAGE COSTS | | | | |
| AVERAGE AVAILABILITY | | | | |
| AVERAGE TIME THAT AVAILABILITY COVERS | | | | |
| AVAILABILITY BEING MET | | | | |
| HOURLY REVENUE LOSS FOR UNSCHEDULED OUTAGES | | | | |
| HOURLY REVENUE LOSS FOR SCHEDULED OUTAGES | | | | |
| HOURLY PRODUCTION LOSS FOR UNSCHEDULED OUTAGES | | | | |

GUI 1000

FIGURE 12

| COST PARAMETERS | COMPUTER SYSTEM 1 | COMPUTER SYSTEM N | STORAGE SYSTEM 1 | STORAGE SYSTEM N |
|---|---|---|---|---|
| OUTAGE COSTS (CONT) | | | | |
| HOURLY PRODUCTION LOSS FOR SCHEDULED OUTAGES | | | | |
| AVERAGE NUMBER OF USERS AFFECTED BY UNSCHEDULED OUTAGE | | | | |
| AVERAGE NUMBER OF USERS AFFECTED BY SCHEDULED OUTAGE | | | | |
| OUTAGE PENALTIES | | | | |
| AVERAGE HOURLY COST OF OUTAGES | | | | |
| AVERAGE ANNUAL HOURS OF OUTAGES | | | | |
| ANNUAL ADDITIONAL LOST REVENUE OR PRODUCTIVITY | | | | |
| % OF STORAGE COST ATTRIBUTABLE TO OUTAGES | | | | |
| % STORAGE COST FOR OUTAGES | | | | |
| GROWTH COSTS | | | | |
| ANNUAL DISK CAPACITY GROWTH | | | | |
| ANNUAL TAPE CAPACITY GROWTH | | | | |
| ANNUAL FTE GROWTH | | | | |
| ANNUAL FTE BURDEN GROWTH | | | | |
| ANNUAL SERVER GROWTH | | | | |
| % STORAGE COST FOR GROWTH | | | | |
| FINANCIAL ASSUMPTIONS | | | | |
| CORPORATE INTERFACE COSTS | | | | |
| NUMBER OF YEARS FOR BUSINESS CASE | | | | |
| ESTIMATED ANNUAL REDUCTION IN HARDWARE COST | | | | |
| ESTIMATED ANNUAL INFLATION RATE | | | | |
| TOTAL COST | | | | |
| PRICE PER GB | | | | |
| COMMENTS | | | | |

GUI 1000

FIGURE 13

| PROCESS | COMPUTER SYSTEM 1 | | | | STORAGE SYSTEM 1 | | | | TOTAL |
|---|---|---|---|---|---|---|---|---|---|
| | PLAN | DESIGN | OPS. | OTHER | PLAN | DESIGN | OPS | OTHER | |
| SATISFY CUSTOMER RELATIONSHIPS | | | | | | | | | |
| UNDERSTAND CUSTOMER REQS. | | | | | | | | | |
| MARKET STORAGE SERVICES | | | | | | | | | |
| ADMINISTER STORAGE SERVICE LEVELS | | | | | | | | | |
| PROVIDE OPERATIONAL SUPPORT | | | | | | | | | |
| MANAGE CUSTOMER SATISFACTION | | | | | | | | | |
| PROCESS SUB-TOTAL | | | | | | | | | |
| PROVIDE MANAGEMENT SYSTEM | | | | | | | | | |
| ESTABLISH MANAGEMENT FRAMEWORK | | | | | | | | | |
| DEFINE PROCESSES AND ORGS. | | | | | | | | | |
| EVALUATE MANAGEMENT SYSTEM | | | | | | | | | |
| PROCESS SUB-TOTAL | | | | | | | | | |
| MANAGE BUSINESS VALUE | | | | | | | | | |
| UNDERSTAND COSTS AND VALUE | | | | | | | | | |
| RESEARCH STORAGE TECHNOLOGY | | | | | | | | | |
| DEVELOP STORAGE STRATEGY | | | | | | | | | |
| JUSTIFY STORAGE SERVICES | | | | | | | | | |
| MONITOR STORAGE SERVICES | | | | | | | | | |
| PROCESS SUB-TOTAL | | | | | | | | | |
| REALIZE CUSTOMER SOLUTIONS | | | | | | | | | |
| UNDERSTAND SOLUTION REQUIREMENTS | | | | | | | | | |
| DESIGN SOLUTIONS | | | | | | | | | |
| IMPLEMENT AND INTEGRATE SOLUTIONS | | | | | | | | | |
| TEST SOLUTIONS | | | | | | | | | |
| CERT. AND CUST. SATISFACTION | | | | | | | | | |
| PROCESS SUB-TOTAL | | | | | | | | | |

GUI 1400

FIGURE 14

| PROCESS | COMPUTER SYSTEM 1 | | | | STORAGE SYSTEM 1 | | | | TOTAL |
|---|---|---|---|---|---|---|---|---|---|
| | PLAN | DESIGN | OPS. | OTHER | PLAN | DESIGN | OPS. | OTHER | |
| DEPLOY SOLUTIONS | | | | | | | | | |
| DEFINE CHANGE MANAGEMENT POLICIES | | | | | | | | | |
| PLAN DEPLOYMENT OF CHANGE | | | | | | | | | |
| ADMINISTER CHANGE | | | | | | | | | |
| IMPLEMENT CHANGE | | | | | | | | | |
| PROCESS SUB-TOTAL | | | | | | | | | |
| DELIVER OPERATIONAL SERVICES | | | | | | | | | |
| DEFINE SERVICE DELIVERY PLAN | | | | | | | | | |
| ALLOCATE STORAGE RESOURCES | | | | | | | | | |
| COLLECT PERF. AND UTIL. DATA | | | | | | | | | |
| PERFORM MAINTENANCE | | | | | | | | | |
| PROCESS SUB-TOTAL | | | | | | | | | |
| SUPPORT NETWORK SERVICES | | | | | | | | | |
| MANAGE CONFIGURATION INFO | | | | | | | | | |
| MANAGE AVAILABILITY | | | | | | | | | |
| MANAGE FACILITIES | | | | | | | | | |
| MANAGE BACK-UP AND RECOVERY | | | | | | | | | |
| MANAGE SERVICE CONTINUITY | | | | | | | | | |
| MANAGE PERFORMANCE AND CAPACITY | | | | | | | | | |
| MANAGE PROBLEMS | | | | | | | | | |
| PROCESS SUB-TOTAL | | | | | | | | | |
| MANAGE NETWORK ASSETS | | | | | | | | | |
| MANAGE FINANCE | | | | | | | | | |
| MANAGE PROCUREMENT | | | | | | | | | |
| PRICING AND CUSTOMER CONTRACTS | | | | | | | | | |
| MANAGE INVENTORY AND ASSETS | | | | | | | | | |
| MANAGE SECURITY | | | | | | | | | |
| MANAGE HUMAN RESOURCES | | | | | | | | | |
| MANAGE SKILLS AND TRAINING | | | | | | | | | |
| PROCESS SUB-TOTAL | | | | | | | | | |
| TOTAL | | | | | | | | | |

GUI 1400

FIGURE 15

| STORAGE ASSETS AND ASSET CHARACTERISTICS | ASSET #1 | ASSET #2 | ASSET #3 | ASSET #N |
|---|---|---|---|---|
| ASSET DESCRIPTION | | | | |
| VENDOR | | | | |
| PRODUCT ID | | | | |
| COMPATIBLE OPERATING SYSTEMS | | | | |
| LOCATION | | | | |
| STORAGE TYPE | | | | |
| NUMBER OF CONNECTED SERVERS | | | | |
| NUMBER OF SERVER CONNECTIONS | | | | |
| OWNED OR LEASED | | | | |
| % DEPRECIATED (IF OWNED) | | | | |
| CHARGE PER MONTH (IF LEASED) | | | | |
| ACQUISITION COST | | | | |
| ACQUISITION DATA | | | | |
| DEPRECIATION TERM | | | | |
| MAINTENANCE CONTRACT | | | | |
| MAINTENANCE COST PER YEAR | | | | |
| NUMBER OF MONTHS INSTALLED | | | | |
| MAXIMUM STORAGE CAPACITY | | | | |
| INSTALLED STORAGE CAPACITY | | | | |
| HOT SPARE STORAGE CAPACITY | | | | |
| AVAILABLE STORAGE CAPACITY | | | | |
| UTILIZED STORAGE CAPACITY | | | | |
| RAID LEVEL | | | | |

GUI 1600

FIGURE 16

| PROJECT ID | PROJECT NAME | ROLL-OUT DATE | TOTAL PROJECT BUDGET | PRELIM. STORAGE BUDGET | STORAGE SAVINGS | FINAL STORAGE BUDGET |
|---|---|---|---|---|---|---|
| X1 | REPORTING UPGRADE | 02/01/06 | $1 M | $500 K | $50 K | $450 K |
| X2 | BILLING SYSTEM | 03/05/06 | $500 K | $250 K | $25 K | $225 K |
| X3 | PICTURE MAIL | 06/06/06 | $3 M | $1.5 M | $500 K | $1 M |
| X4 | PLATFORM REPLACE | 06/12/06 | $8 M | $4 M | $1.6 M | $2.4 M |
| X5 | SECURITY UPGRADE | 09/01/06 | $200 K | $100 K | $10 K | $90 K |
| TOTAL | | | $12.7 M | $6.35 M | $2.185 M | $3.8 M |

GUI 2000

FIGURE 20

ASSIGNMENT OF DATA FLOWS TO STORAGE SYSTEMS IN A DATA STORAGE INFRASTRUCTURE FOR A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the management of data storage systems for a communication network.

2. Description of the Prior Art

A communication network provides various communication services to network users. A few examples of communication networks include public switched networks, wireless access networks, and Internet networks. A few examples of communication services include voice communications, data transfer, video delivery, and Internet access.

The operation of a communication network produces vast quantities of data that need to be stored. To provide the data storage, the communications network includes a storage infrastructure that includes a wide array of storage equipment and software. Typically, the storage equipment and software are provided by a diverse set of suppliers. Each supplier has their own management system for their products. Unfortunately, the result is a complex set of storage equipment and software with numerous individual management systems. In a large communication network, this type of complex storage infrastructure is difficult and expensive to manage.

The communication network also employs various personnel to plan, deploy, and operate the storage infrastructure. The complexity of the storage infrastructure is often reflected in a complex set of personnel that are responsible for various aspects of the storage infrastructure. In such a complex personnel organizational structure, some important storage tasks may be under-worked, while less important tasks may be overworked, or worse, redundantly performed by overlapping organizations.

The result of this complex storage infrastructure is often wasted expense and inefficiency. The management of the storage infrastructure and personnel in a communication network has not developed any systematic approach that decreases cost and improves efficiency. Improved tools for managing storage infrastructures and personnel are needed.

For example, when the communication network produces a new data flow for storage, the selection of the appropriate storage system for data may be uninformed. Storage personnel may not properly consider all factors before making the selection. A typical result is that less important data uses up capacity on the best storage system, when that capacity should be reserved for more important data.

In another example, the storage infrastructure typically develops over time in terms of personnel and technology. Decisions regarding which technology to deploy are often made without a clear and detailed view of what technology is most needed. Thus, the decisions regarding the deployment of new technology in the complex storage infrastructure are often uninformed decisions. Likewise, decisions regarding which personnel to deploy are often made without a clear and detailed view of what is most needed. New tools are needed to improve decision making related to how new personnel and technology are utilized.

In another example, the storage infrastructure may become vary large and complex. The size and complexity of the infrastructure results in massive costs. The ability to analyze these massive costs to ensure a return on investment is difficult. Effective cost models are needed to allow the analysis of costs at various levels and perspectives.

In another example, the storage infrastructure may require a large employee base with various skills and tasks. The size and complexity of the employee base can make it difficult to decide how to use the employees. Effective employee models are needed to allow the analysis of employee effectiveness at various levels and perspectives.

In another example, the storage infrastructure may require a vast amount of equipment and software. The size and complexity of the infrastructure can make it difficult to track and maintain the equipment and software in the infrastructure. Effective infrastructure models are needed to track the components of the storage infrastructure.

In another example, the storage infrastructure requires funding for maintenance and growth. The size and complexity of the infrastructure can make it difficult to forecast and track funding requirements. Effective scheduling information for funding is needed.

In another example, the storage infrastructure is typically under constant change as new systems are planned, tested, and operated. The size and complexity of the infrastructure can make it difficult to track the current status of applications and systems. Information on the status of applications and systems is needed.

SUMMARY OF THE INVENTION

Examples of the invention include data storage infrastructures and methods for a communication network that produces a plurality of data flows of network data. The data storage infrastructure comprises a plurality of data storage systems and a storage management system. The data storage systems are configured to store the network data using a plurality of data storage service classes, wherein different ones of the data storage systems provide different ones of the data storage service classes. The storage management system is configured to process characteristics for the data flows to assign individual ones of the data flows to individual ones of the data storage systems.

In some examples of the invention, the different ones of the data storage service classes have different data storage reliabilities.

In some examples of the invention, the characteristics indicate functions of the data flows.

In some examples of the invention, the characteristics indicate users of the data flows.

In some examples of the invention, the characteristics indicate monetary values of the data flows.

In some examples of the invention, the characteristics indicate priorities of the data flows.

In some examples of the invention, the characteristics indicate life-cycles of the data flows.

In some examples of the invention, the characteristics indicate legal compliance requirements of the data flows.

In some examples of the invention, the characteristics indicate inter-dependencies of the data flows.

In some examples of the invention, the characteristics indicate performance requirements of the data flows.

BRIEF DESCRIPTION OF THE DRAWINGS

The same reference number represents the same element on all drawings.

FIG. 7 illustrates a GUI for assessing personnel gaps in an example of the invention.

FIG. 8 illustrates a GUI for assessing process gaps in an example of the invention.

FIG. 9 illustrates a GUI for assessing technology gaps in an example of the invention.

FIG. 10 illustrates a GUI for providing a cost model in an example of the invention.

FIG. 11 illustrates a GUI for providing a cost model in an example of the invention.

FIG. 12 illustrates a GUI for providing a cost model in an example of the invention.

FIG. 13 illustrates a GUI for providing a cost model in an example of the invention.

FIG. 14 illustrates a GUI for providing an employee model in an example of the invention.

FIG. 15 illustrates a GUI for providing an employee model in an example of the invention.

FIG. 16 illustrates a GUI for providing an inventory model in an example of the invention.

FIG. 20 illustrates a GUI for providing funding information for the storage infrastructure in an example of the invention.

DETAILED DESCRIPTION OF THE PREFERRED EMBODIMENT

FIGS. 1-26 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Data Storage for a Communication Network

Figure 1:
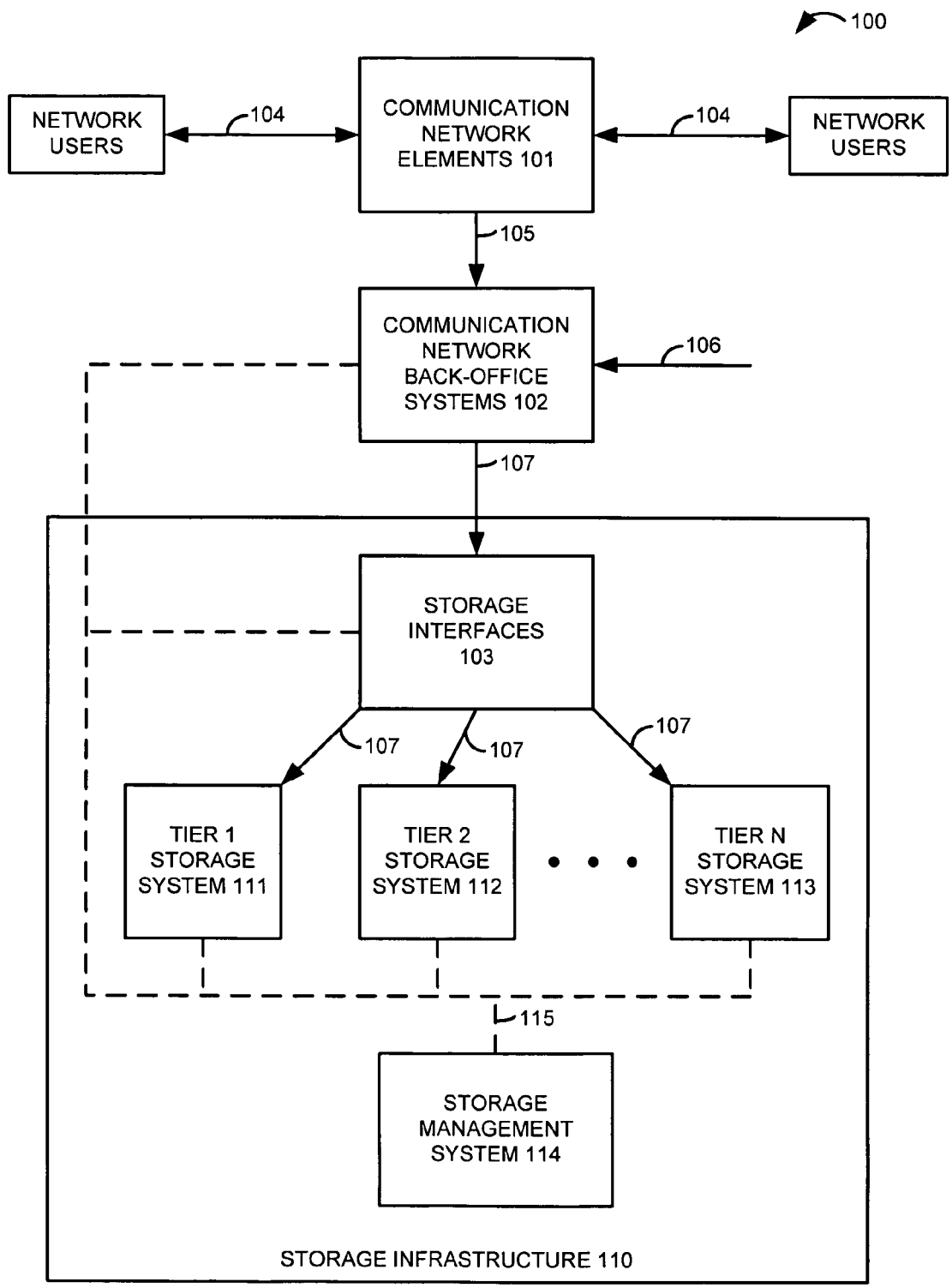
FIG. 1 illustrates a communication system having a storage infrastructure in an example of the invention.

FIG. 1 illustrates communication network 100 in an example of the invention. Communication network 100 includes communication network elements 101, back-office systems 102, storage interfaces 103, storage systems 111-113, and storage management system 114. Storage infrastructure 110 is a part of communication network 100 that comprises storage interfaces 103, storage systems 111-113, and storage management system 114. Storage systems 111-113 are separated into tiers 1-N, where system 111 provides tier 1 storage, system 112 provides tier 2 storage, and system 113 provides tier N storage. As indicated on FIG. 1, there could be many storage tiers.

Communication network elements 101 exchange user communications 104 between network users to provide communication services. The communication services could include wireless, interne, telephony, video, data, or some other communications service. The network users maybe customers of communication network 100 or they may be other communication networks (having their own customers). Communication network elements 101 could include telephony switches, packet routers, wireless base stations, servers, databases, call processors, communication gateways, optical systems, and other communication equipment that are required to support the communication services provided by communication network elements 101. Communication network elements 101 transfer element data 105 to back-office systems 102. Element data 105 includes billing information, performance information, user content, and other data that is generated or handled by communication network elements 101.

Back-office systems 102 receive element data 105 from communication network elements 101. Back-office systems 102 also receive other data 106 from other network systems and personnel (not shown). Back-office systems 102 comprise servers and computer systems that are configured to be network element management systems, customer information systems, order entry systems, communication probes, and other systems that support the communication services provided by communication network elements 101.

For example, network elements 101 can include Service Control Points (SCPs) and back office systems 102 can include an SCP management system. Network elements 101 can include local telephone switches and back office systems 102 could include a telephony billing system. Network elements 101 can include a packet network and back office systems 102 could include a picture mail server. Network elements 101 and back office systems 102 could include numerous other systems.

Back-office systems 102 process element data 105 and other data 106 to transfer network data 107 to storage interfaces 103. Storage interfaces 103 could be Storage Area Network (SAN) switches, Network-Attached Storage (NAS) gateways, and other devices that exchange data between back-office systems 102 and storage systems 111-113. Storage interfaces 103 transfer network data 107 to storage systems 111-113. Thus, storage interfaces 103 direct network data 107 to the appropriate ones of storage systems 111-113.

Storage systems 111-113 receive and store network data 107. Storage systems 111-113 could include disk memory systems, tape memory systems, integrated circuitry memory systems, or some other type of data storage system or media. Note that storage systems 111-113 are tiered based on performance, where tier 1 has the best performance and tier N has the poorest performance. Typically, tier 1 is the most expensive and tier N is the least expensive. Performance can be measured based on availability. For example, tier 1 storage system 111 may have 99.999% or higher availability and exceptional performance, and tier N storage system 113 may have 97%-99.0% availability. Mid-range tiers could have availabilities in between 99.0% and 99.999%. For example, tier 2 storage system 112 could have 99.9% to 99.999% availability. Other performance measures, such as retrieval speeds or disaster recovery features, could also factor into assigning a tier value to storage systems 111-113.

Storage management system 114 is coupled to back-office systems 102, storage interfaces 103, and storage systems 111-113 by control links 115. Storage management system 114 manages several aspects of storage infrastructure 110 and is described in detail below.

Figure 2:
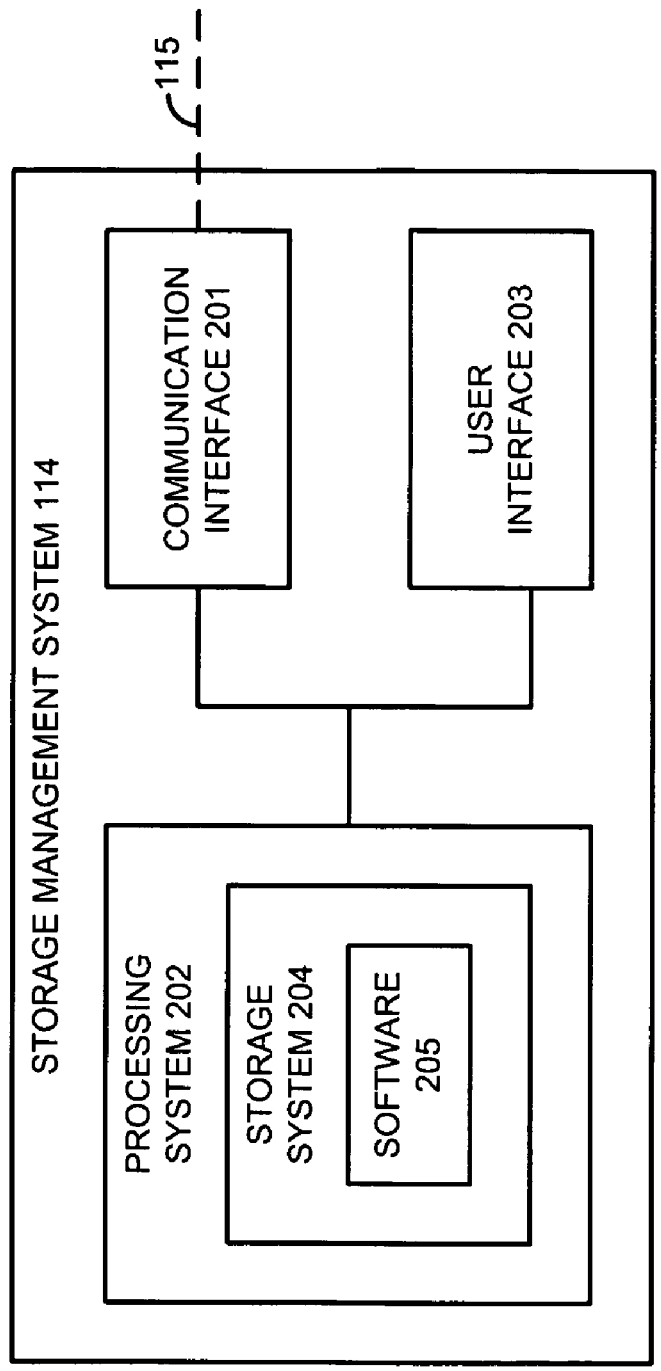
FIG. 2 illustrates a storage management system in an example of the invention.

FIG. 2 illustrates storage management system 114 in an example of the invention. Storage management system 114 includes communication interface 201, processing system 202, and user interface 203. Processing system 202 includes storage system 204. Storage system 204 stores software 205. Processing system 202 is linked to communication interface 201 and user interface 203. Storage management system 114 could be comprised of a programmed general-purpose computer, although those skilled in the art will appreciate that programmable or special purpose circuitry and equipment may be used. Storage management system 114 may use a client server architecture where operations are distributed among a server system and client devices that together comprise elements 201-205.

Communication interface 201 is coupled to control link 115. Communication interface 201 could comprise a network interface card, modem, port, or some other communication device. Communication interface 201 may be distributed among multiple communication devices. Processing system 202 could comprise a computer microprocessor, logic circuit, or some other processing device. Processing system 202 may be distributed among multiple processing devices. User interface 203 includes a Graphical User Interface (GUI) display and could also comprise a keyboard, mouse, voice recognition interface, microphone and speakers, or some other type of user device. User interface 203 may be distributed among multiple user devices. Storage system 204 could comprise a disk, tape, Write Once Read Many (WORM) device, storage appliance, integrated circuit, server, or some other memory device. Storage system 204 may be distributed among multiple memory devices.

Processing system 202 retrieves and executes software 205 from storage system 204. Software 205 may comprise an operating system, utilities, drivers, networking software, and other software typically loaded onto a general-purpose computer. Software 205 could comprise an application program, firmware, or some other form of machine-readable processing instructions. When executed by processing system 202, software 205 directs processing system 202 to operate as described herein.

Note that storage management system 114 may be concentrated in a single system or distributed across many systems. In some examples, storage management system 114 uses a client server architecture having a central server (i.e. processing system 202) and multiple client devices (i.e. user interfaces 203) so multiple users may simultaneously use storage management system 114.

Data Flow Assignment to Storage System Tiers

Figure 3:
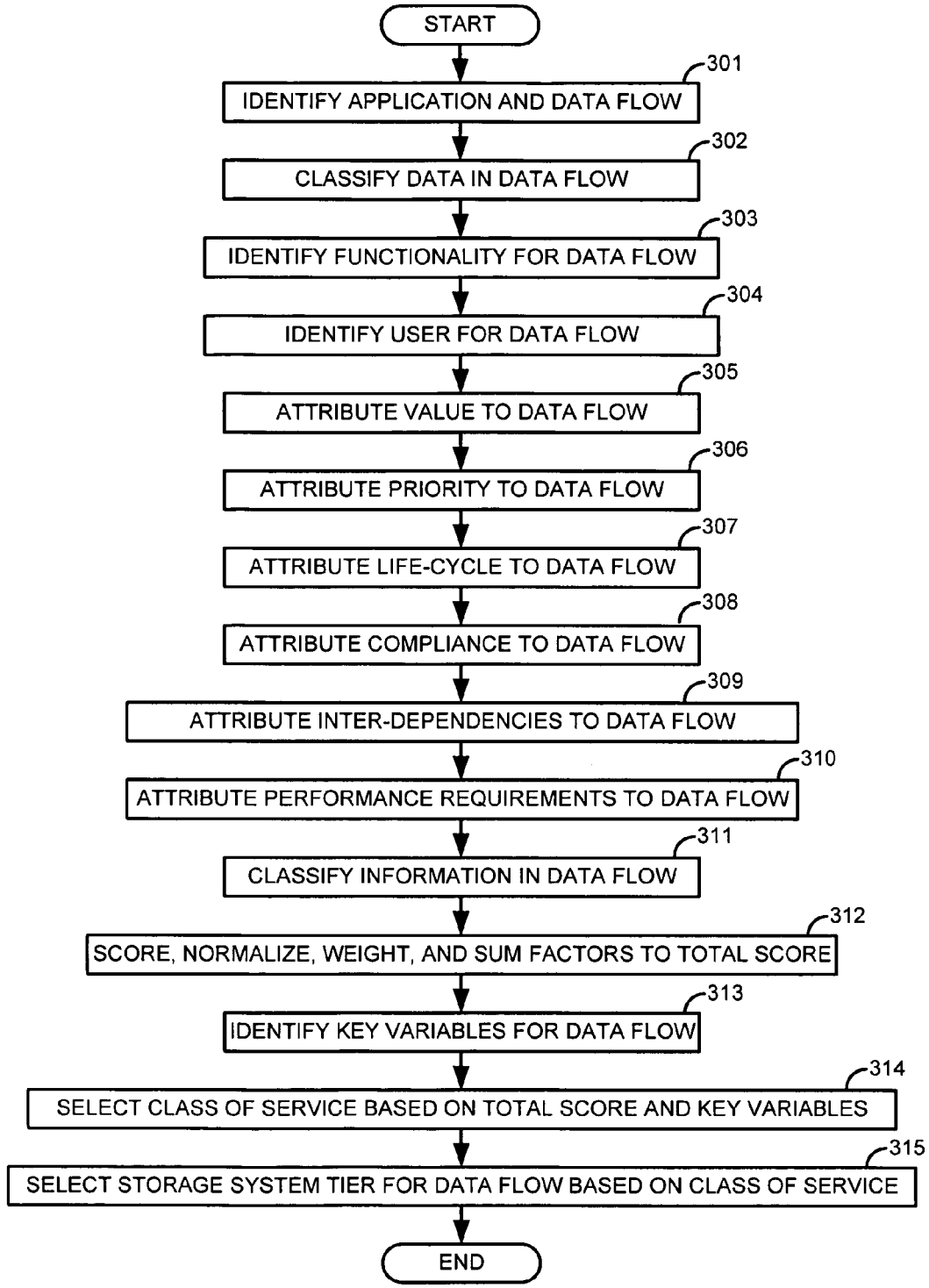
FIG. 3 illustrates a process for assigning data flows to storage system tiers in an example of the invention.

FIG. 3 illustrates the operation of storage management system 114 when assigning an application data flow to a storage system tier in an example of the invention. The reference numbers from FIG. 3 are indicated parenthetically below. Typically, the tier assignment is accomplished by an operator interacting with storage management system 114 through its GUI. To determine the tier assignment, the data flow is first analyzed to determine various factors for the data flow.

Storage management system 114 starts the process by identifying an application and by identifying the data flows for the application (301). Typically, communication network personnel will identify applications and their data flows to the operator for entry into storage management system 114. An application is any functionality in communication network 100 that provides network data 107. The network data 107 for the application can be separated into identifiable data flows. A single application can have one data flow or multiple data flows. For example, the application could be a push-to-talk service that has individual data flows for billing, customer information, and performance information.

For a given data flow, storage management system 114 classifies the data in the data flow (302). The data classes include:

Communication Path—data that is associated with the set-up and operation of communication sessions for customers. For example, the routing data stored in an SCP would be classified in the communication path data class.

Accounting—data that indicates network utilization so the users may be charged for communication services. For example, call detail records for individual calls would be classified in the accounting data class.

Fault and Alarm—data that indicates problems with communication network elements 101. For example, a Synchronous Optical Network (SONET) alarm indicating an optical fiber cut would be classified in the fault and alarm data class.

Configuration—data that is associated with the addition, deletion, and modification of the connections and topology of communication network 100. For example, a network architecture data flow would be classified in the configuration data class.

Performance—data that indicates network performance measurements. For example, a data flow from a probe that measures the number of packets transferred over a connection would be classified in the performance data class.

Security—data that controls access to network resources and sensitive data. For example, authorization codes that allow operations personnel to access and program Internet routers would be classified in the security data class.

Content—data that includes content that is received from or delivered to customers. For example, videos that are available for customer download would be classified in the customer content data class.

Legal Compliance—data that is required by applicable laws or regulations. For example, data required for compliance with Sarbanes-Oxley regulations would be classified in the legal compliance data class.

Statistical Analysis—data that indicates network analysis and reports. For example, data for reporting network outages to government agencies would be classified in the statistical analysis data class.

Service Level Agreement (SLA) Management—data class that indicates compliance with customer service agreements. For example, trouble tickets that impact a customer's service would be classified in the SLA management data class.

Figure 4:
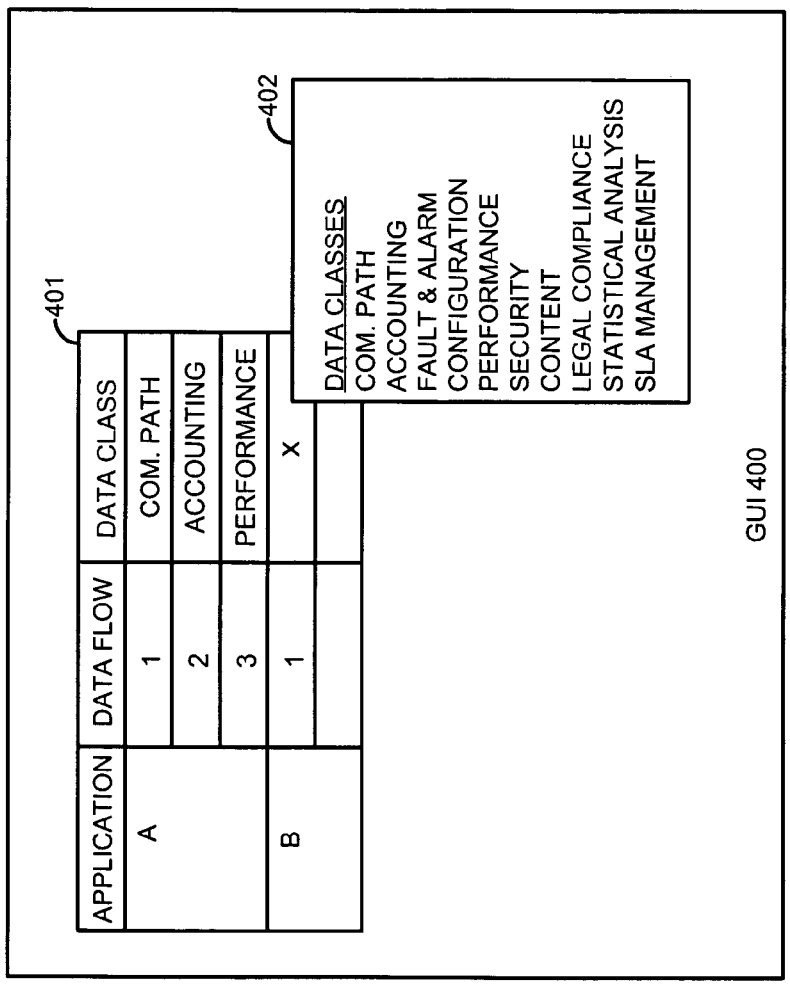
FIG. 4 illustrates a GUI for assigning data flows to data classes in an example of the invention.

To classify the data in the data flow, storage management system 114 provides the operator with a choice of data classes for each data flow through a drop down menu or some other GUI mechanism. All data flows are classified into a consistent set of data classes. For example, FIG. 4 shows GUI 400 with table 401 for identifying applications, data flows, and data classes through operator entry. The data classes for application "A" have already been selected. After the operator positions the GUI cursor (indicated by an "X" on FIG. 4) over the field for entering the data class for data flow #1 of application "B", drop down menu 402 appears with the data classes for selection. The operator may then position the cursor over the selected data class for automatic entry of the selected data class into the field.

For a classified data flow, storage management system 114 identifies a functionality for the data flow (303). The functionality represents the purpose of the data flow. To identify a functionality for the data flow, the operator is given a choice of functions through a drop down menu or some other GUI mechanism. All data flows are attributed with functionality from a consistent set of functions. Although there are typically numerous functions, a small example of functions could be:

Function #1—Phone activation.

Function #2—Data link provisioning.

Function #3—Customer billing.

Function #4—Optical network alarms.

Function #5—Sarbanes-Oxley reporting.

Like the GUI operations depicted above, the operator may position the GUI cursor over the function field for a given data flow, and a drop down menu box appears with the functions for selection. The operator may position the cursor over the selected function range for automatic entry of the selected function into the field.

For a given data flow, storage management system 114 identifies a user for the data flow (304). The user represents the entity in communication network 100 that needs the data storage for the data flow. To identify a user for the data flow, the operator is given a choice of users through a drop down menu or some other GUI mechanism. All data flows are attributed with users from a consistent set of users. Although there are typically numerous users, a small example of users could be:

User #1—Wireless network operations.

User #2—Customer service.

User #3—Packet network design.

User #4—Optical network procurement.

User #5—Legal.

Like the GUI operations depicted above, the operator may position the GUI cursor over the user field for a given data flow, and a drop down menu box appears with the users for selection. The operator may position the cursor over the selected user for automatic entry of the selected user into the field.

For a given data flow, storage management system 114 attributes a value to the data flow (305). The value represents a monetary value of the data flow to communications network 100. To attribute a value to the data flow, the operator is given a choice of monetary ranges for each data flow through a drop down menu or some other GUI mechanism. All data flows are attributed with a value from a consistent set of monetary ranges. For example, monetary ranges could be:

Range #1—less than $1,000,000.

Range #2—$1,000,000 to $10,000,000.

Range #3—$10,000,001 to $100,000,000.

Range #4—$100,000,001 to $1,000,000,000.

Range #5—Over $1,000,000,000.

Like the GUI operations depicted above, the operator may position the GUI cursor over the value field for a given data flow, and a drop down menu box appears with the monetary ranges for selection. The operator may position the cursor over the selected monetary range for automatic entry of the selected range into the field.

Storage management system 114 attributes a priority to the data flow (306). The priority represents the importance of the data flow to communication network 100 in terms of access delay, geographically diverse back-up, and disaster recovery. To attribute a priority to the data flow, the operator is given a choice of priority levels for each data flow through a drop down menu or some other GUI mechanism. All data flows are attributed with a priority from a consistent set of priority levels. For example, priority levels could be:

Priority Level #1—data access in less than 10 seconds with geographic diversity and disaster recovery.

Priority Level #2—data access in less than 1 hour with geographic diversity and disaster recovery.

Priority Level #3—data access in less than 1 day with geographic diversity and disaster recovery.

Priority Level #4—data access in less than 1 day with geographic diversity and without disaster recovery.

Priority Level #5—data access in less than 1 day without geographic diversity and without disaster recovery.

Like the GUI operations depicted above, the operator may position the GUI cursor over the priority field for a given data flow, and a drop down menu box appears with the priority levels for selection. The operator may position the cursor over the selected priority level for automatic entry of the selected level into the field.

Storage management system 114 attributes a life-cycle to the data flow (307). The life-cycle represents a time period during which the data flow retains value to communications network 100. To attribute a life-cycle to the data flow, the operator is given a choice of time periods for each data flow through a drop down menu or some other GUI mechanism. All data flows are attributed with a life-cycle from a consistent set of time periods. For example, time periods could be:

Life-cycle #1—less than 7 days.

Life-cycle #2—8 days to 31 days.

Life-cycle #3—32 days to one year.

Life-cycle #4—one year to five years.

Life-cycle #5—greater than five years.

Like the GUI operations depicted above, the operator may position the GUI cursor over the life-cycle field for a given data flow, and a drop down menu box appears with the time periods for selection. The operator may position the cursor over the selected time period for automatic entry of the selected period into the field.

Storage management system 114 attributes compliance requirements to the data flow (308). The compliance requirements indicate if the data flow needs to be kept for legal purposes. To attribute compliance requirements to the data flow, the operator is given a choice of compliance types for each data flow through a drop down menu or some other GUI mechanism. All data flows are attributed with compliance requirements from a consistent set of compliance types. For example, compliance types could be:

Compliance Type #1—required by the Federal Communication Commission (FCC).

Compliance Type #2—required by Sarbanes-Oxley.

Compliance Type #3—required by the Internal Revenue Service (IRS).

Compliance Type #4—none.

Like the GUI operations depicted above, the operator may position the GUI cursor over the compliance field for a given data flow, and a drop down menu box appears with the compliance types for selection. The operator may position the cursor over the selected compliance type for automatic entry of the compliance requirements into the field.

Storage management system 114 attributes inter-dependencies to the data flow (309). The inter-dependencies indicate other applications that are dependent on the current data flow. To attribute inter-dependencies to the data flow, the operator is given a choice of other applications for each data flow through a drop down menu or some other GUI mechanism. All data flows are attributed with inter-dependencies from a consistent set of applications.

Like the GUI operations depicted above, the operator may position the GUI cursor over the inter-dependencies field for a given data flow, and a drop down menu box appears with the applications for selection. The operator may position the cursor over the selected application for automatic entry of the selected applications into the field.

Storage management system 114 attributes performance requirements to the data flow (310). The performance requirements indicate any specific industry-recognized performance metrics that are required for the data flow. To attribute performance requirements to the data flow, the operator is given a choice of industry-recognized performance metrics for each data flow through a drop down menu or some other GUI mechanism. All data flows are attributed with performance requirements from a consistent set of performance metrics.

Like the GUI operations depicted above, the operator may position the GUI cursor over the performance requirements field for a given data flow, and a drop down menu box appears with the performance metrics for selection. The operator may position the cursor over the selected performance metric for automatic entry of the selected requirements into the field.

The data flow may also be associated with other factors in a similar manner. In addition, some of the factors described above could be omitted.

For a given data flow, storage management system 114 classifies the information represented by the data (311). The information classes include:

Service path—information related to service set-up and operation. For example, a data flow having routing information stored in an SCP would be classified in the service path information class.

Revenue—information related to revenue generation and support. For example, a data flow of call detail records would be classified in the revenue information.

Operational Support—information related to faults, alarms, and the status of communication network elements 101. For example, a SONET alarm indicating an optical fiber cut would be classified in the operational support information class.

Content—information related to the content that is received from or delivered to customers. For example, videos that are available for customer download would be classified in the content information class.

Compliance and Reporting—information that is required by applicable laws or regulations. For example, information required for compliance with Sarbanes-Oxley regulations would be classified in the compliance and reporting data class.

Figure 5:
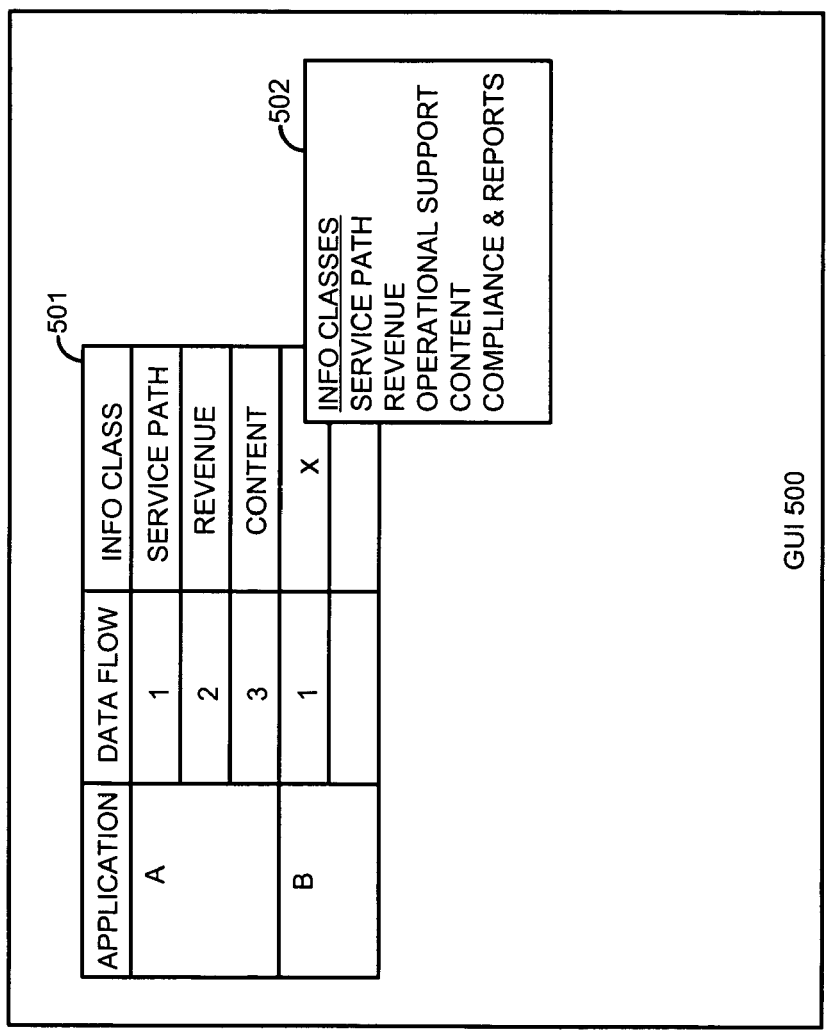
FIG. 5 illustrates a GUI for assigning data flows to information classes in an example of the invention.

To classify the information in the data flow, storage management system 114 provides the operator with a choice of information classes for each data flow through a drop down menu or some other GUI mechanism. All data flows are classified into a consistent set of information classes. For example, FIG. 5 shows GUI 500 with table 501 for identifying applications, data flows, and information classes through operator entry. The information classes for application "A" have already been selected. After the operator positions the GUI cursor (indicated by an "X" on FIG. 5) over the field for the information class for data flow #1 of application "B", drop down menu 502 appears with the information classes for selection. The operator may position the cursor over the selected information class for automatic entry of the selected class into the field.

The above factors are data class, functionality, user, value, priority, life-cycle, compliance, inter-dependencies, performance, and information class. As noted, the factors that network management system 114 makes available for selection are controlled and consistent. Each factor that is available for selection has a corresponding score. For example, the life-cycle factors could be scored as follows:

Life-cycle #1—less than 7 days: score=1.

Life-cycle #2—8 days to 31 days: score=2.

Life-cycle #3—32 days to one year: score=3.

Life-cycle #4—one year to five years: score=4.

Life-cycle #5—greater than five years: score=5.

For a given data flow, the scores for all of its factors are added together to get a total score for the data flow (312). Prior to summing to the total score, the individual scores may be normalized. For example, the life-cycle scores could be normalized by dividing by 5, so that all life-cycle scores are between zero and one. Prior to summing the total score, the individual scores may be weighted to emphasize or de-emphasize a given factor. For example, life-cycle scores could be multiplied by 1.5 to increase the importance of the life-cycle factor relative to the other factors, but priority scores could be multiplied by 0.5 to decrease the importance of the priority factor relative to the other factors. Once the individual scores are normalized and weighted, the normalized and weighted individual scores are summed to obtain the total score for the data flow.

For the data flow, a set of key variables is assessed to determine compatibility between the data flow and the various classes of service (313). In this example the classes of service are: extremely critical, mission critical, business critical, and back-office/reporting, although different classes-of-service could be used. The key variables are:

Access Frequency—what is the amount of access to the data that will be needed during a given time period.

Archival and Deletion—does the data need to be stored for more than a given time period and does the data need to be deleted at a given time in the future.

Availability—what percent of time must the storage system be able to provide the data.

Back-up—does the data need to be stored in the system at all.

Business Continuity and Disaster Recovery—what level of business continuity and/or disaster recovery capability is required. For example, is protection required from a simultaneous two-site failure.

Communication Path—is the data required for the establishment and operation of communication paths for customers.

Primary Repository—will the storage system be the primary source of the data

Connectivity—what type of Input/Output (I/O) is required for data access.

Data Loss—what percent of the data can be lost.

Data Migration—what percent of the data must be ported to other systems Data Change what percent of the data changes over a given time period.

Policy Enforcement—are there polices regarding the ability to change or delete the data.

Disk-based Replication—is disk-based back-up required for the data.

Geographic Locations—how many storage sites are required for the data.

Business Impact—is there a significant business impact if the data is lost.

Load Balancing and Multi-Pathing—are load balancing and/or multipathing needed to support I/O requirements for the data.

Monitoring Requirements—what are the requirements for checking and reporting the status of the storage system.

Operational Flexibility—how flexible must the storage system be to handle changes in I/O, capacity, or other items.

Performance—are there any specific performance requirements for the data.

Provisioning—how fast does the storage service need to be established for the data Recovery Techniques—what recovery techniques are needed. For example, is point-in-time recovery needed.

Recovery Timeframe—what is the allowed time period for data recovery.

Response Time—what is the allowed time period to provide the data to external systems.

Service Loss—how much service loss is acceptable during data recovery.

For each class of service, the variables values are:

| Variable | Extremely Critical | Mission Critical | Business Critical | Back-office, Reporting |
|---|---|---|---|---|
| Access frequency | Very High | Very High | High | Medium |
| Archival and deletion | Yes | Yes | Yes | Yes |
| Availability | 99.999% | 99.990% to 99.90% | 99.90% to 99.0% | 97.0% to 99.0% |
| Back-up | Yes | Yes | Yes | Yes |
| Business continuity and disaster recovery | Yes | Yes | No | No |
| Com. path | Yes | No | No | No |
| Compliance | No | No | No | Yes |
| Connectivity | Multiple | Multiple | Multiple | SLA specific |
| Data loss | No | Recoverable up to a point in time | Recoverable up to a point in time | Application specific |
| Data migration | Yes | Yes | Yes | Yes |
| Data change | Very high | Very high | Very high | High |
| Policy enforcement | Yes | Yes | Yes | Yes |
| Disk-based replication | Yes | Yes, for selected data | No | No |
| Geographic locations | Multiple | Multiple for selected data | No | No |
| Business impact | Yes | Yes | No | No |
| Load balancing and multi-pathing | Yes | Yes | Yes | SLA specific |
| Monitoring requirements | 27×7×365 immediate alert | 27×7×365 immediate alert | 27×7×365 immediate alert | Periodic alert during business hours |
| Operational flexibility | High | High | High | High |
| Performance | Exceptional | Exceptional | High | Medium |
| Provisioning | 1-3 days | 1-3 days | 1-5 days | 5-7 days |
| Recovery techniques | Point-in-time, Multiple geographical sites, synchronous & asynchronous | Point-in-time, Multiple geographical sites, synchronous & asynchronous | Point-in-time | Point-in-time |
| Recovery timeframe | 10-59 minutes | 1-12 hours | 12-48 hours | 2-5 business days |
| Response time | Very high | Very high | High | High |
| Service loss | No | Brief | Yes | Yes |

Figure 6:
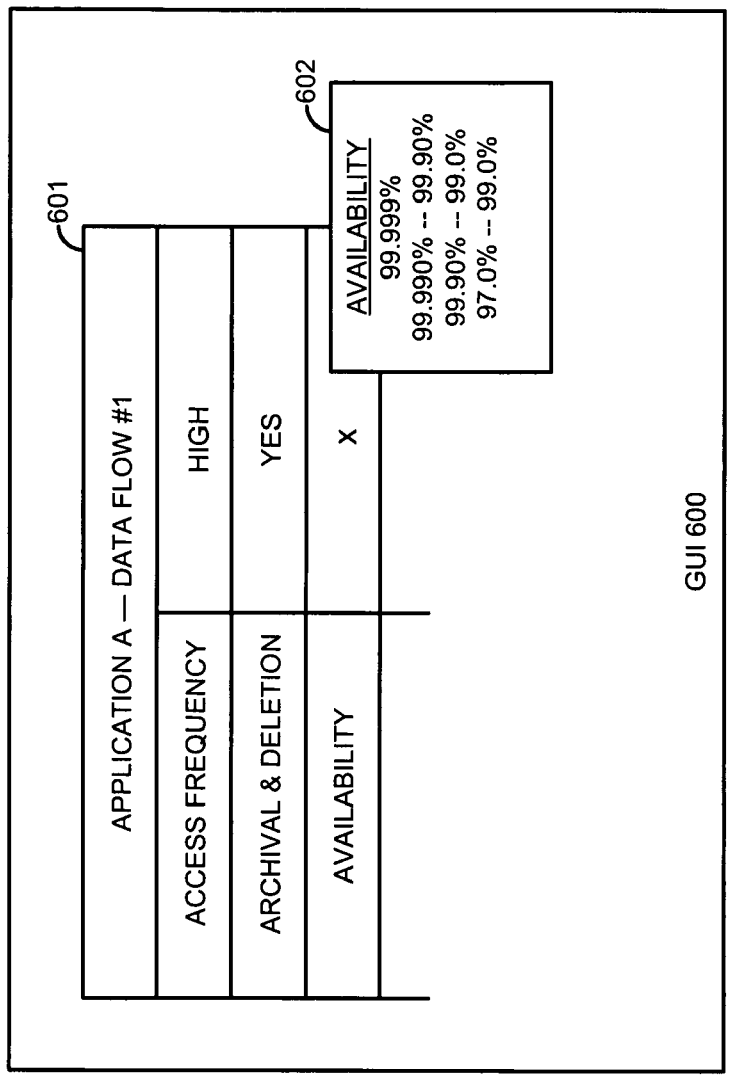
FIG. 6 illustrates a GUI for assigning variables to data flows in an example of the invention.

To assess the key variables for the data flow, storage management system 114 provides the operator with a choice of variable values for the data flow through a drop down menu or some other GUI mechanism. All data flows use a consistent set of variables and values. For example, FIG. 6 shows GUI 600 with table 601 for identifying applications, data flows, and variable values through operator entry. For application "A"—data flow #1, the values for access frequency and archival & deletion are respectively "HIGH" and "YES." After the operator positions the GUI cursor (indicated by an "X" on FIG. 6) over the field for "AVAILABILITY," drop down menu 602 appears with the availability values for selection. The operator may position the cursor over the selected value for automatic entry of the selected availability value into the field.

Storage management system 114 selects the class of service for the data flow based on the key variables and the total score (314). For example, once the variables are selected for the data flow, storage management system 114 compares the data flow variables against the class-of-service variables to determine which classes-of-service are suitable for the data flow. The total score is used to select from among the suitable classes of service. For example, both the extremely critical and mission critical classes-of-service may be suitable for a given data flow. The extremely critical class-of-service may be used if the data flow has a total score higher than 10 and the mission critical class-of-service may be used if the data flow has a total score of 10 or lower.

For the data flow, storage management system 114 selects a storage system tier based on the selected class of service (315). Typically, each class-of-service is pre-assigned to a storage system tier. New tiers and classes-of-service may be implemented over time.

In some examples, storage management system 114 may transfer control messages indicating the selected storage system tier for the data flow to the selected tier of storage systems 111-113 and to storage interfaces 103. In response to the control messages, storage interfaces 103 route the data flow to the selected tier, and the storage system in the selected tier stores the data and provides the various storage features available at that tier.

It should be appreciate that storage management system 114 provides a tool for assisting the operator in assigning data flows to storage tiers. Advantageously, storage management system 114 requires the operator to consider a rigorous set of factors and variables in a consistent and disciplined manner for each data flow. The result is a high-quality and consistent approach to the assignment of data flows to data storage system tiers.

Technology and Personnel Management

Network management system 114 manages storage infrastructure personnel, processes, technology in some examples of the invention. To accomplish this task, network management system 114 interacts with an operator through its GUI to develop a current and future view of the personnel, processes, and technology for storage infrastructure 110. Advantageously, network management system 114 requires the operator to apply a rigorous and detailed analysis to accurately identify the gaps between the current state and a desired future state for storage infrastructure 110 at the personnel, process, and technology levels.

FIG. 7 illustrates GUI 700 that is provided by network management system 114 to manage personnel. The left column of GUI 700 lists various services that are provided by storage infrastructure personnel. These services comprise:

Architecture Design—technical planning for the storage system.

Asset Management—care of the storage system equipment.

Back-up—assessing whether data should be stored in the storage system.

Billing—charging and receiving money from storage system users.

Capacity Management—planning and control of storage system capacity.

Change Management—planning and control over changes to the storage system.

Configuration Management—planning and control over storage system equipment configurations.

Data Movement—planning and control over data migration and transfer.

Customer Relationship—interface with storage system users.

Disaster Recovery—planning and control over storage system equipment/site failure.

Life-cycle management—planning and control over storage and deletion time frames.

Problem Management—Trouble-shooting and remediation.

Monitoring—assessing storage system status and notifying system personnel and users of issues.

Performance—Management measuring storage system performance against SLAs.

Procurement—acquiring and installing storage system equipment.

Provisioning—establishing storage services for new applications.

Replication—copying data to a back-up storage systems.

Reporting—generating technical information about the storage system.

Restoration—recovering data after storage system failure.

The top row of GUI 700 includes several categories to prompt operator input or indicate management system output. The categories are:

Currently Delivered—indicates that personnel provide the service at present.

Primary Organization—indicates the main organization that provides the service.

Current Hours—indicates the number of hours that the primary organization spends providing the service per time period (hours per month for example).

Targeted Hours—indicates a desired number of hours that the primary organization should spend providing the service in a future time period. (hours in the next month for example).

Secondary Organization—indicates any support organization that helps provide the service.

Current Hours—indicates the number of hours that the secondary organization spends providing the service per time period (hours per month for example).

Targeted Hours—indicates a desired number of hours that the secondary organization should spend providing the service in a future time period. (hours in the next month for example).

Personnel Gap—indicates the difference between the current hours and the targeted hours for the primary and secondary organizations.

For each service, storage management system 114 obtains a yes or no response from the operator in the Currently Delivered column on GUI 700. For any services that are currently being delivered, storage management system 114 uses GUI 700 to obtain the primary organization that currently provides the service from the operator. GUI 700 also obtains any secondary organizations that currently provide the service. Like the GUI operations depicted above, the operator may position the GUI cursor over the primary organization field or secondary organization field for a given service, and a drop down menu box appears with the various organizations for selection. The operator may position the cursor over the selected organization for automatic entry of the selected organization into the field.

For any services that are currently being delivered, storage management system 114 uses GUI 700 to obtain the current hours that the primary organization and any secondary organizations use to provide the service. For each service, storage management system 114 uses GUI 700 to obtain the targeted hours that the primary organization and any secondary organizations should use to provide the service.

On a per-service basis, network management system 114 totals the current hours for the primary and secondary organizations and totals the targeted hours for the primary and secondary organizations. On a per-service basis, network management system 114 subtracts the total of targeted hours from the total for current hours to identify the personnel gap for that service. Network management system 114 automatically indicates the personnel gaps on a per-service basis in the right column of GUI 700.

For all services, network management system 114 totals the current hours for the primary and secondary organizations and totals the targeted hours for the primary and secondary organizations. Network management system 114 subtracts the total of targeted hours (for all services) from the total for current hours (for all services) to identify the personnel gap for all services. Network management system 114 automatically indicates the personnel gap for all services at the right in the bottom row of GUI 700.

FIG. 8 illustrates GUI 800 that is provided by network management system 114 to manage process. The left column of GUI 800 lists various service that are provided by storage infrastructure personnel and described above for FIG. 7. The top row of GUI 800 includes several categories to prompt operator input or indicate management system output. The categories are:

Documented Process Exists—indicates if the service follows a documented process, such as a pert chart.

Primary Process Owner—indicates the main organization that provides the service.

Secondary Process Owner—indicates any support organization that helps provide the service.

Primary Process User—indicates the main organization that uses the service.

Secondary Process User—indicates any other organizations that use service.

Current Maturity Level—indicates the current complexity of the process.

Targeted Maturity Level—indicates the desired complexity of the service.

Process Gaps—indicates the difference between the current maturity level and the targeted maturity level for each service.

For each service, storage management system 114 obtains a yes or no response from the operator in the Documented Process column on GUI 800. For each service, storage management system 114 uses GUI 800 to obtain the primary organization that currently provides the service from the operator. GUI 800 obtains any secondary organizations that currently provide the service. Likewise, GUI 800 also obtains primary and secondary process users from the operator. Like the GUI operations depicted above, the operator may position the GUI cursor over a process owner or user field for a given service, and a drop down menu box appears with the various organizations for selection. The operator may position the cursor over the selected organization for automatic entry of the selected organization into the field.

For each service, storage management system 114 uses GUI 800 to obtain the current maturity level of the process and the desired maturity level for the process. Like the GUI operations depicted above, the operator may position the GUI cursor over a maturity level field for a given service, and a drop down menu box appears with the various maturity levels for selection. The operator may position the cursor over the selected level for automatic entry of the selected maturity level into the field.

For example, a maturity index could be defined from one to ten where an index of one indicates minimum complexity and an index of ten indicates maximum complexity. The various indexes could be differentiated by reference to industry standards, technologies, or other applicable descriptions. Thus, a maturity index could be used to indicate the current maturity level of the process for the service.

On a per-service basis, network management system 114 compares the current and targeted maturity levels to determine the difference. If a maturity index is used, the numerical difference between the two indexes could be used. Network management system 114 automatically indicates the maturity difference on a per-service basis in the right column of GUI 800.

FIG. 9 illustrates GUI 900 that is provided by network management system 114 to manage technology. The left column of GUI 900 lists various services that are provided by storage infrastructure personnel and described above for FIG. 7. The top row of GUI 900 includes several categories to prompt operator input or indicate management system output. The categories are:

Existing Hardware & Vendor—indicates the current equipment used to provide the service and the supplier of the equipment.

Existing Software & Vendor—indicates the current software used to provide the service and the supplier of the software.

Existing External Services—indicates external resources (contractors and service providers for example) that are used to provide the service Gaps—indicates the personnel and process gaps from GUIs 700 and 800.

Hardware to be purchased—indicates additional hardware to be purchased and installed.

Software to be purchased—indicates additional software to be purchased and installed.

External Service to be purchased—indicates additional external resources to be purchased.

For each service, storage management system 114 obtains the existing hardware, software, and external services from the operator in the applicable columns on GUI 900.

For each service, storage management system 114 indicates the personnel and process gaps developed in GUI 700 and GUI 800. Like the GUI operations depicted above, the operator may position the GUI cursor over a given field, and a drop down menu box appears with the various items for selection. The operator may position the cursor over the selection for automatic entry of the selection into the field.

For each service, storage management system 114 uses GUI 900 to obtain from the operator the hardware, software, and external services to be purchased and to obtain the time of the purchase. When making a purchasing decision for a service, the operator can view the existing technology (hardware, software, external services) used to deliver the service, and the operator can also view the personnel and process gaps for the service. Advantageously, network management system 114 enables purchasing decisions to be made that close these gaps. Thus, technology is used to reduce personnel gaps and to improve process maturity.

Storage Infrastructure Cost Model

Storage infrastructure 110 includes numerous storage systems 111-113 that include disks, tape, and other memory devices and media. Storage infrastructure 110 includes numerous computer systems, such as servers, that form a part of storage interfaces 103 and provide I/O to the storage systems 111-113. Sometimes, these computer systems have internal storage devices, such as internal disks, that also form a part of storage systems 111-113. In addition, storage infrastructure 110 requires personnel, communication networking, operating environments, and other numerous other resources.

Network management system 114 manages costs associated with storage infrastructure 110 in some examples of the invention. To accomplish this task, network management system 114 interacts with an operator through its GUI to develop individual cost models for the individual computer systems and storage systems that comprise storage infrastructure 110. For each computer system and storage system, network management system 114 processes the model to provide a cost per unit of storage, such as dollars per Gigabit (GB). Advantageously, network management system 114 allows for direct comparison of the costs associated with the various computer systems and storage systems to improve the management of storage infrastructure 110.

FIGS. 10-13 illustrate GUI 1000 that is provided by network management system 114 to manage cost. The left column of GUI 1000 lists various cost parameters related to employees, servers, internal disks, external disks, tape, networking, software, additional equipment, environment, outages, growth, and finance. The top row lists various computer systems and storage systems. The number of computer and storage systems could be much larger and has been restricted for clarity.

In some cases, the operator may directly enter data for a given parameter of a given system. In other cases, the operator may position the GUI cursor over a data field, and a drop down menu box appears with the various values for selection. The operator may position the cursor over the selected value for automatic entry of the selected value into the data field. In yet other cases, network management system 114 may retrieve the value from another system or calculate the value from other inputs. Thus, GUI 1000 is filled with information on a per computer system or per storage system basis. Network management system 114 then processes that information to provide comparative costs and comments for the computer and storage systems.

The cost parameters for employee costs are:

Number of primary Full Time Employees (FTEs)—the number of FTEs whose primary task is associated with a given storage or computer system.

Annual cost per primary FTEs—an estimate of the annual burdened cost of a primary FTE.

Number of secondary FTEs—the number of FTEs whose primary task is not associated with a given storage or computer system, but who are secondarily associated with a given storage or computer system.

Annual cost per secondary FTEs—an estimate of the annual burdened cost of a secondary FTE.

Additional FTE costs—extra costs for FTEs not captured above, such as training and retention costs.

Service contract costs—annual costs for personnel service contracts.

% of storage cost for FTEs—FTE costs divided by total costs.

The parameters for computer system (server) costs are:

Number of servers—the total number of servers.

Average cost of small servers—the cost of servers with 1 Central Processing Unit (CPU).

Average cost of medium servers—the cost of servers with 2-3 CPUs.

Average cost of large servers—the cost of servers with 4 or more CPUs.

% of infrastructure comprised of small servers—the ratio of small servers to all servers as indicated by relative number of CPUs, transactions per second, number of servers, or some other metric.

% of infrastructure comprised of medium servers—the ratio of medium servers to all servers as indicated by relative number of CPUs, transactions per second, number of servers, or some other metric.

% of infrastructure comprised of large servers—the ratio of large servers to all servers as indicated by relative number of CPUs, transactions per second, number of servers, or some other metric.

Servers saved by consolidation—an estimate of the number of servers that would be saved by using large servers.

Number of years for server amortization—the number used by accounting for tax purposes.

% of server costs not for internal disks—the ratio of server costs that are not internal disk costs, such as software and accessory costs, to the total server costs.

% of server cost for environment—environmental costs divided by total costs.

The cost parameters for internal disk costs are:

Total cost of internal disks—the total cost for all internal disks.

Total data capacity of internal disks—the total data capacity of all internal disks.

Available data capacity of internal disks—the unused but available data capacity of all internal disks.

Purchased but uninstalled capacity—the data capacity for internal disks that are paid for but not yet available in the storage system.

% of storage cost for internal disks—internal disk costs divided by total costs.

The cost parameters for external disk costs are:

Total data capacity of external disks—the total data capacity of all external disks.

Available data capacity of external disks—the unused but available data capacity of all external disks.

Purchased but uninstalled capacity—the data capacity for external disks that are paid for but not yet installed.

Number of years for external disk amortization—the number used by accounting for tax purposes.

Annual disk configuration fees—the annual cost of configuring external disks.

Annual disk maintenance fees—the annual cost of maintaining external disks.

Annual cost per GB for external disks—total cost for external disks divided by the total storage capacity of the external disks.

% of storage cost for external disks—external disk costs divided by total costs.

The cost parameters for tape costs are:

% of tape capacity in use—the amount of data on tape divided by the total storage capacity of tape.

Number of tape drives—the total number of tape drives.

Number of tape libraries—the total number of multiple tape drive systems (tape libraries).

Average capacity of tape cartridges—the storage capacity of a tape cartridge.

Number of tape cartridges—the number of tape cartridges.

Annual tape hardware cost—the total yearly cost for tape hardware.

Annual tape vaulting cost—the total yearly cost for tape vaulting.

Annual tape media cost—the total yearly cost for the tape itself.

Number of years for tape system amortization—the number used by accounting for tax purposes.

% of storage cost for tape—tape costs divided by total costs.

The cost parameters for networking costs are:

Total network costs—the cost of the communication network serving the storage network % of network used for storage—the amount of bandwidth used by the given system divided by the total bandwidth of the communication network.

Amount of data backed-up per day—the daily GB of data transferred over the network to/from a given system for back-up.

Back-up window met—was the data backed-up on time.

Restoration meeting Service Level Agreements (SLAs)—is data being restored according to SLA requirements.

Networking cost per unit storage—(the total cost of the communication network)×(the % of the communication network used by the system for storage)÷(the storage units provided by the system).

% of storage cost for networking—networking costs divided by total costs.

The cost parameters for software costs are:

Average annual cost of software for disks—the yearly software cost for disks.

Average annual cost of software for tape—the yearly software cost for tape.

Average annual cost of software for servers—the yearly software cost for servers.

% of storage cost for software—software costs divided by total costs.

The cost parameters for additional equipment costs are:

Annual Storage Area Network (SAN) equipment costs—the yearly cost for SAN equipment, such as SAN cabling and switches.

Annual network hardware costs—the yearly cost for networking hardware, such as blades, Network Attached Storage (NAS) filers, and other storage appliances.

Annual telecommunication costs—the yearly cost for telecom equipment and services not included under networking costs.

Annual infrastructure costs—the yearly cost for floor space, racks, etc.

Other storage equipment costs—annual miscellaneous additional equipment costs not captured above.

% of storage cost for additional equipment additional equipment costs divided by total costs.

The cost parameters for environmental costs are:

Annual environmental costs—yearly cost for electricity, heating, lighting, cooling, etc.

Annual additional service related to storage—yearly cost of miscellaneous environmental services.

Annual business continuity costs—yearly loss due to environmental downtime.

% of storage cost for environment—environmental costs divided by total costs.

The cost parameters for outage costs are:

Average availability—the % of time that data is available from the system.

Average time that the availability covers—the time in hours, days, weeks during which the availability is provided.

Availability being met—indicates if the promised availability was delivered by the system.

Hourly revenue loss for unscheduled outages—lost revenue (i.e. sales) per hour for unscheduled outages.

Hourly revenue loss for scheduled outages—lost revenue (i.e. sales) per hour for scheduled outages.

Hourly productivity loss for unscheduled outages—lost productivity (i.e. FTE hours) per hour for unscheduled outages.

Hourly productivity loss for scheduled outages—lost productivity (i.e. FTE hours) per hour for scheduled outages.

Average number of users affected by unscheduled outages—the typical number of users impacted by unscheduled outages.

Average number of users affected by scheduled outages—the typical number of users impacted by scheduled outages.

Outage penalties—cost penalties (i.e. in SLAs) attributed to outages.

Average hourly cost of outages—the average lost revenue and productivity per hour for scheduled and unscheduled outages.

Average annual hours of outages—average hours of outages per year.

Annual additional lost revenue or productivity—costs for outages not captured above.

% of storage costs for outages—outage costs divided by total cost.

The cost parameters for growth costs are:

Annual disk capacity—growth the yearly increase in disk storage divided by total disk storage.

Annual tape capacity growth—the yearly increase in tape storage divided by total tape storage.

Annual FTE growth—the yearly increase in the number of FTEs divided by total

FTEs.

Annual FTE burden growth—the yearly increase in FTE costs disk storage divided by total FTE costs.

Annual server growth—the yearly increase in the number of servers divided by total servers.

% of storage cost for growth—growth costs divided by total costs.

The cost parameters for financial assumptions are:

Corporate interface costs—the cost to interface with corporate executives and justify capital expenses.

Number of years for business case—the number of years for a return on investment in the business case.

Annual reduction in hardware costs—estimate of the percent reduction in hardware costs.

Inflation rate—estimate of the annual inflation rate.

Network management system 114 processes the above information to indicate total costs per unit storage ($/GB) for each computer system and server system on GUI 1000. Network management system 114 also processes the above information to indicate comments for each computer system and server system on GUI 1000.

For example, network management system 114 can calculate cost per unit of storage (GB) per system as follows.

> Cost per unit storage=cost of computer or storage system÷the data capacity of the computer or storage system.

Network management system 114 can calculate the various data capacities on a per system basis as follows.

> Storage capacity=total capacity of external disks+total capacity of internal disks+total capacity of tape.

Network management system 114 can calculate the various costs on a per system basis as follows.

> Total system cost=FTE costs+server costs+internal disk costs+external disk costs+tape costs+network costs+software costs+additional equipment costs+environmental costs+outage costs+growth costs; where > FTE costs=(number of primary FTEs×primary FTE cost)+(number of secondary FTEs×secondary FTE cost)+service contract costs.

> Server costs=(number of servers×% of small servers× average cost of small servers)+(number of servers×% of medium servers×average cost of medium servers)+(number of servers×% of large servers×average cost of large servers).

Internal disk costs=total cost for internal disks.

External disk costs=(total GB of external disks×cost per GB for external disks)+disk configuration fees+disk maintenance fees.

Tape costs=tape hardware cost+tape vaulting cost+ tape media cost.

Network costs=total network cost×% of network used for storage.

Software costs=software cost for disks+software cost for tape+software cost for servers.

Additional equipment costs=SAN equipment cost+ network hardware cost+telecommunication cost+ infrastructure cost+storage equipment cost.

Environmental cost=environmental cost+miscellaneous cost.

Outage cost=average hourly cost of outages×annual hours per year of outages.

Growth costs=(% disk growth×total disk capacity× average cost of disks)+(% server growth×total servers×average cost of server)+(% tape growth× total tape capacity×average cost of tape hardware, media, and vaulting)+(% FTE growth×total FTEs×average burdened cost of FTE).

Advantageously, network management system 114 provides a detailed cost model that is broken down by computer and storage system. By using the cost per gigabyte calculations, the operator may directly compare the cost effectiveness of the various systems.

Storage Infrastructure Employee Model

Storage infrastructure 110 includes numerous storage systems 111-113 that include disks, tape, and other memory devices and media. Storage infrastructure 110 includes numerous computer systems, such as servers, that form a part of storage interfaces 103 and provide I/O to the storage systems 111-113. Storage infrastructure 110 requires employees—referred to as Full Time Employees (FTEs)—to plan, design, and operate the storage infrastructure. This entails planning, designing, and operating the computer systems and storage systems that comprise the storage infrastructure. The FTEs execute various processes to perform these tasks.

Network management system 114 manages the FTEs associated with storage infrastructure 110 in some examples of the invention. To accomplish this task, network management system 114 interacts with an operator through its GUI to develop individual FTE models for the individual computer systems and storage systems that comprise storage infrastructure 110. In addition, network management system 114 interacts with the operator through the GUI to develop individual FTE models for the planning, design, and operation of storage infrastructure 110. Advantageously, the models indicate FTE use at the process level as correlated to the computer systems, storage systems, and activities related to planning, design, and operation.

FIGS. 14-15 illustrate GUI 1400 that is provided by network management system 114 to manage FTEs. The left column of GUI 1400 lists various processes performed by the FTEs. The top row lists the computer and storage systems although the number depicted is restricted for clarity, numerous other computer and storage system could be added to the top row. Beneath each system are columns for planning, design, operations, and other activities. Planning activities relate to the development of a strategic plan for the infrastructure. Design activities relate to the development of detailed designs to implement the infrastructure plan. Operational activities relate to running the infrastructure as implemented. The other column is for activities that are not primarily related to planning, design, or operations. The percent of FTE time that is spent on a given activity in the performance of a given process for a given system is entered into the corresponding field.

In some cases, the operator may directly enter data for a given field. In other cases, the operator may position the GUI cursor over a field, and a drop down menu box appears with the various values for selection. The operator may position the cursor over the selected value for automatic entry of the selected value into the field. In yet other cases, network management system 114 may retrieve the value from another system or calculate the value from other inputs. For example, a time management system may be used to track employee time by project or activity, and network management system 114 may retrieve some values from the time management system. Thus, GUI 1400 is filled with information on a per process, per system, and per activity basis. Network management system 110 then processes the information to provide a model that compares FTE usage across systems and activities at the process level.

The processes in the left column are: satisfy customer relationships, provide management system, manage business value, realize solutions, deploy solutions, deliver operational services, support network services, and manage network assets and infrastructure. Each of these processes has a set of sub-processes. The processes and their sub-process are described as follows:

Satisfy Customer Relationships—provide an interface to storage customers.

Understand customer requirements—interact with the customer to develop general customer needs.

Market storage services to customers—inform the customer about storage services.

Administer storage service levels for customers—verify that storage services meet customer Service Level Agreements (SLAs).

Provide operational support to customers—provide customer training, respond to customer questions and comments.

Manage customer satisfaction—interact with the customer to detect problems and verify customer satisfaction.

Provide Management System—develop a management organization and processes.

Establish management framework—identify management roles and responsibilities.

Define management processes and organization—specify how management is carried out and who will perform the processes.

Evaluate management system—monitor and report on management effectiveness.

Manage Business Value—develop storage infrastructure to provide storage services on a cost-benefit basis.

Understand costs and value—analyze the return on investment for storage infrastructure development and storage service offerings.

Research storage technology—investigate new storage technologies and products.

Develop storage strategy—document guiding principles for the storage infrastructure.

Develop and justify storage services—specify basic storage services and perform a cost benefit analysis for the services.

Define storage architecture—develop an infrastructure plan to provide the storage services according to the storage strategy.

Monitor storage services—analyze on-going return on investment for the storage services.

Realize Customer Solutions—develop specific solutions for customers.

Understand solution requirements—develop a detailed set of customer needs.

Design solutions—develop solutions to requirements and identify services to provide solutions.

Implement and integrate solutions—integrate and customize services to provide solutions.

Test solutions—verify solutions are effective.

Certification and customer satisfaction—obtain necessary industry certifications and ensure customer satisfaction for solutions.

Deploy Solutions—configure the storage infrastructure to provide the customer solutions.

Define infrastructure change management policies—specify standards for changing infrastructure configuration.

Plan deployment for infrastructure change—develop a deployment plan for the infrastructure change.

Administer infrastructure change—manage the deployment plan.

Implement infrastructure change—execute the deployment plan.

Deliver Operational Services—operate the storage infrastructure.

Define service delivery plan—develop an operational plan for the infrastructure.

Allocate storage resources—provide resources to execute the operational plan.

Collect performance and utilization data—monitor and report infrastructure performance.

Perform maintenance—perform tasks to maintain the infrastructure.

Support Network Services—provide operational management for the infrastructure

Manage configuration information—provide a secure configuration data repository.

Manage availability—verify that storage systems meet applicable availability standards.

Manage facilities—provide appropriate operating environment.

Manage back-up and recovery—verify that scheduled back-up and recovery operations occur properly.

Manage service continuity—verify that unscheduled back-up and recovery operations occur properly.

Manage performance and capacity—verify that infrastructure performance and capacity are meeting plans and designs.

Manage problems—provide resources to intake, investigate, and resolve problems.

Manage Network Assets and Infrastructure—provide executive management for the infrastructure.

Manage finance—provide accounting and finance control.

Manage procurement—control product and service purchases.

Set pricing and administer customer contracts—establish pricing and negotiate customer agreements.

Manage storage inventory and assets—ensure inventory and assets are handled properly.

Manage security—provide a secure environment for the infrastructure.

Manage human resources—manage employees

Manage skills portfolio and provide training—maintain appropriate skill sets at the organizational and individual levels.

Thus, GUI 1400 lists the percent of FTE time that is spent on various processes and sub-processes as correlated to various activities for various systems. Network management system 114 processes the information on GUI 1400 to provide various totals. Note that process sub-total rows provide sub-totals for each process, and the bottom row provides totals for all processes. The right column provides totals for each process and sub-process for all systems and activities. Advantageously, network management system 114 provides a direct comparison of how FTE time is spent on various processes and systems.

Storage Infrastructure Inventory Model

Storage infrastructure 110 includes numerous storage systems 111-113 that include disks, tape, and other memory devices and media. Storage infrastructure 110 includes numerous computer systems, such as servers, that form a part of storage interfaces 103 and provide I/O to the storage systems 111-113. Thus, storage infrastructure 110 includes numerous devices and systems that are comprised various vendor products. The vendor products represent an asset inventory that must be managed.

Network management system 114 manages the inventory that comprises storage infrastructure 110 in some examples of the invention. To accomplish this task, network management system 114 interacts with an operator through its GUI to develop an inventory model for storage infrastructure 110. Advantageously, the inventory model indicates inventory assets and characteristics of interest. In some cases, the assets are storage systems, such as disk and tape systems.

FIG. 16 illustrates GUI 1600 that is provided by network management system 114 to manage inventory. The top row left column of GUI 1600 lists various inventory assets that comprise storage infrastructure 110. The left column lists various characteristics for each asset. The asset characteristics are indicated below.

Vendor—indicates the supplier of the product.

Operating Systems—indicates compatible operating systems.

Location—identifies the physical site having the asset.

Storage Type—identifies the asset by storage type, such as network attached storage, storage area network, tape, etc.

Number of servers—the number of servers connected to the asset.

Number of connections—the number of connections from the servers to the asset.

Owned or leased—is the asset owned or leased.

% depreciated (if owned)—the age of the asset divided by the amortization term for the asset.

Charge per month (if leased)—the monthly lease payment.

Acquisition cost—the cost to obtain the asset

Acquisition data—the date the asset was acquired.

Depreciation term—the amortization period for the asset.

Maintenance contract—is there a maintenance contract.

Maintenance cost per year—annual maintenance cost.

Number of months installed—the elapsed time since installation.

Maximum capacity—maximum storage capacity of the asset.

Installed capacity—installed storage capacity of the asset.

Hot spare capacity—hot spare capacity available from the asset.

Available capacity—storage capacity available from the asset.

Utilized capacity—% of available storage capacity in use in the asset.

RAID level—the industry standard RAID level of the asset.

In some cases, the operator may directly enter data for a given field. In other cases, the operator may position the GUI cursor over a field, and a drop down menu box appears with the various values for selection. The operator may position the cursor over the selected value for automatic entry of the selected value into the field. In yet other cases, network management system 114 may retrieve the value from another system or calculate the value from other inputs. For example, many assets can report their current capacity to network management system 114 by using over Simple Network Management Protocol (SNMP). Thus, GUI 1600 is filled with information on a per asset basis. Network management system 110 then processes the information to provide a model that compares assets in terms of maximum, installed, available, and in-use storage capacities.

Figure 17:
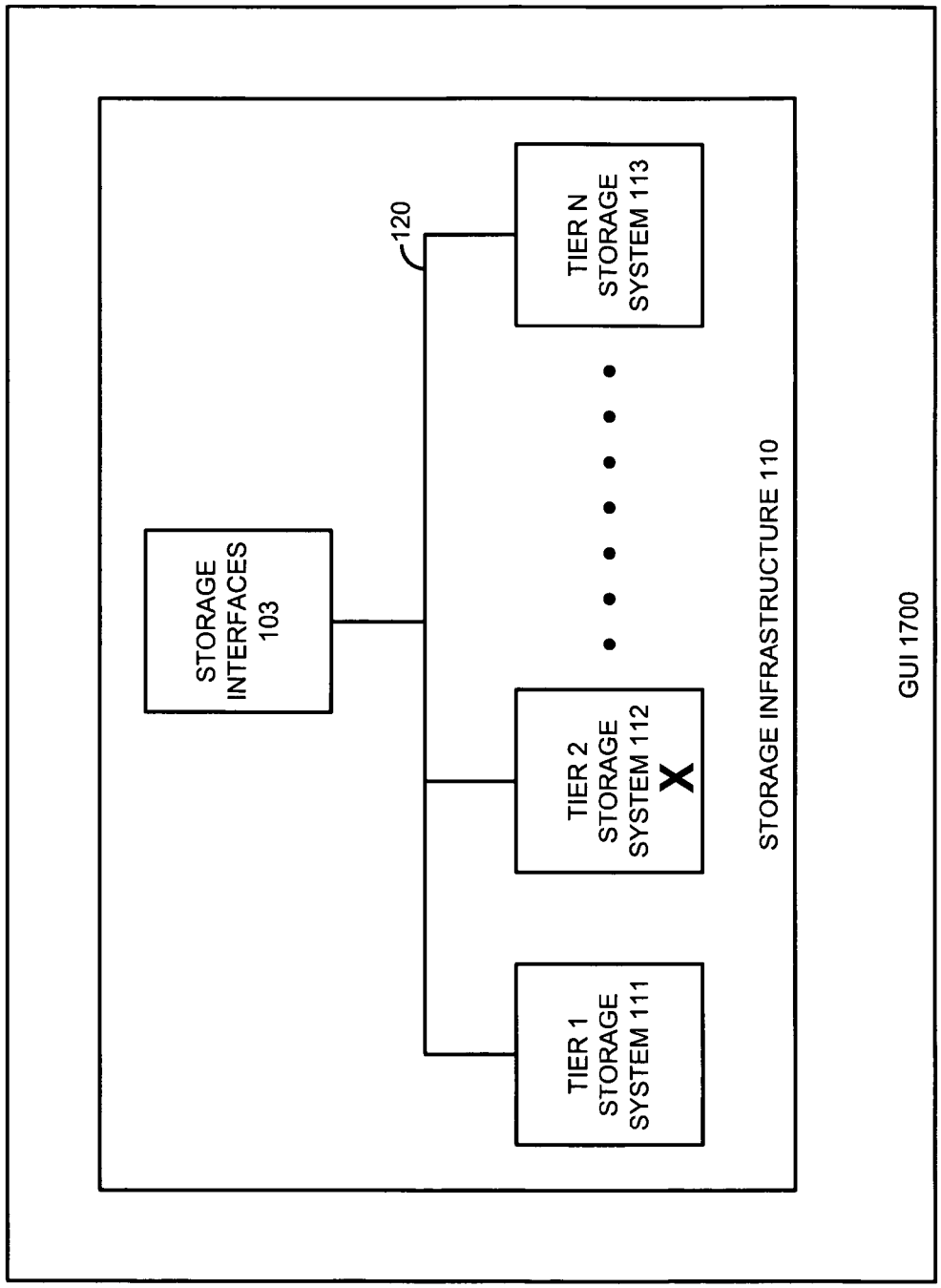
FIG. 17 illustrates a GUI for providing product information for the storage infrastructure in an example of the invention.
Figure 18:
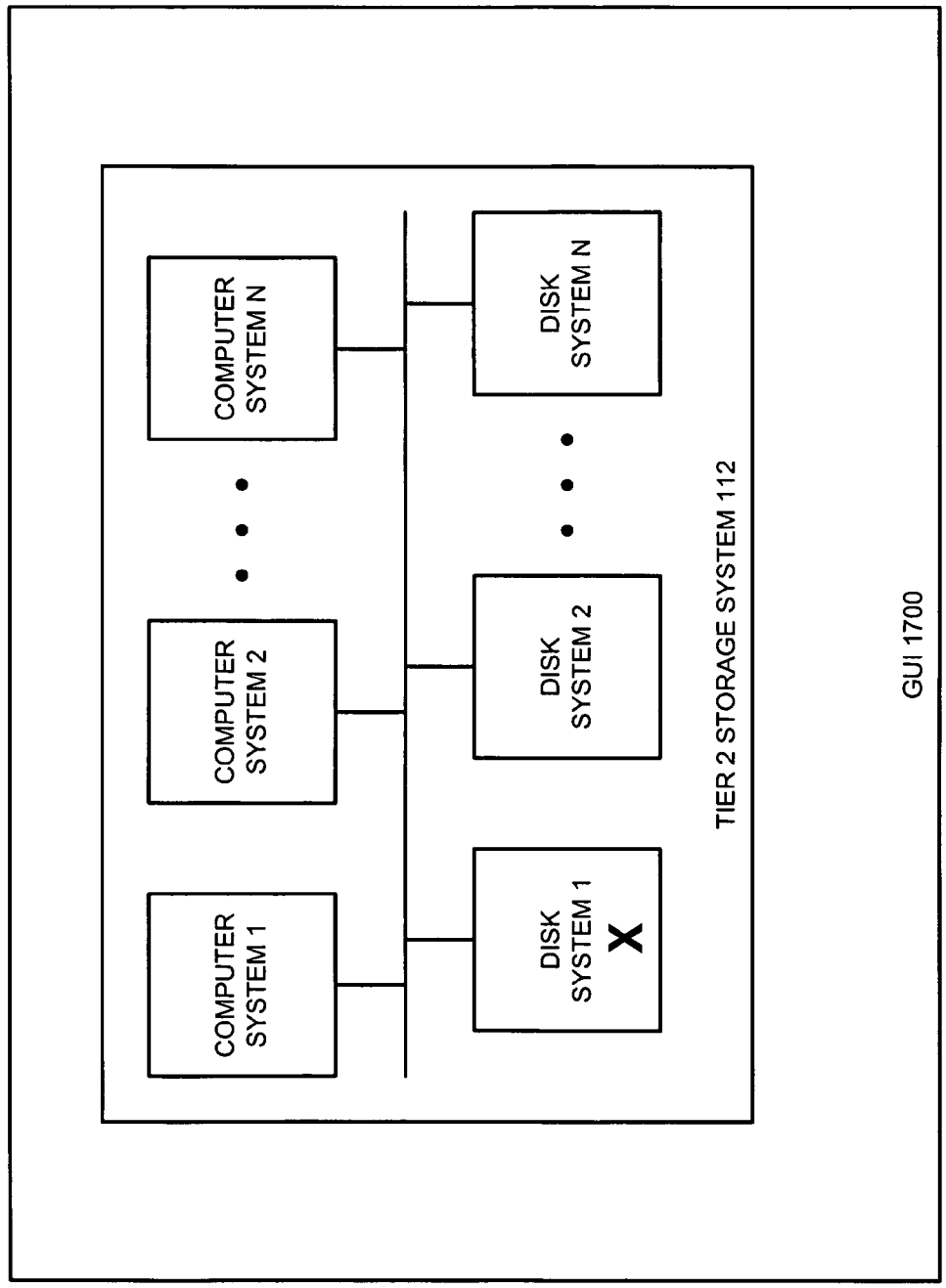
FIG. 18 illustrates a GUI for providing product information for the storage infrastructure in an example of the invention.
Figure 19:
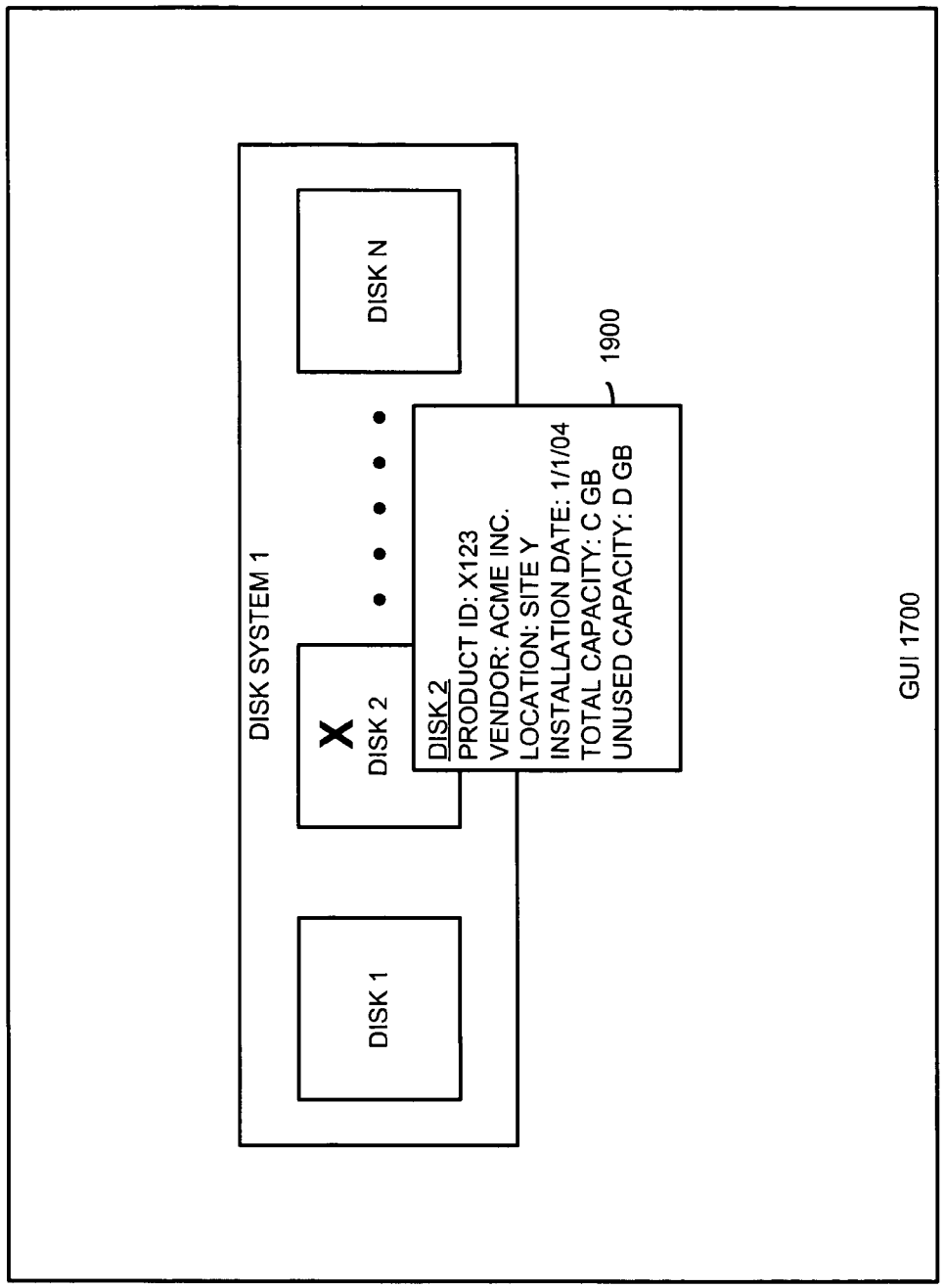
FIG. 19 illustrates a GUI for providing product information for the storage infrastructure in an example of the invention.

FIGS. 17-19 illustrate GUI 1700 that is provided by network management system 114 to manage inventory. GUI 1700 depicts a block diagram of storage infrastructure 110 that includes storage interfaces 103, tiered storage systems 111-113, and network 120. The GUI operator may select one of these elements, such as by clicking the element with a mouse, and GUI 1700 depicts the selected element in further detail. This operator selection process can continue until desired product or status information is provided.

For example, the GUI operator may select tier 2 storage system 112 as indicated by the "X" mark on FIG. 17. In response to the selection of tier 2 storage system 112, GUI 1700 depicts tier 2 storage system 112 in further detail as shown in FIG. 18. On FIG. 18, GUI 1700 shows tier 2 storage system 112 as having computer systems 1-N and disk systems 1-N. The GUI operator may then select disk system 1 as indicated by the "X" mark on FIG. 18. In response to the selection of disk system 1, GUI 1700 depicts disk system 1 in further detail as shown in FIG. 19. On FIG. 19, GUI 1700 shows disk system 2 as having disks 1-N. The GUI operator may finally select disk 2 as indicated by the "X" mark on FIG. 19. In response to the selection of disk 2, GUI 1700 depicts product and status information for disk 2 in an information box as shown in FIG. 19. The information box indicates information for disk 2 including: product ID, vendor, location, installation date, total capacity, and unused capacity. Note that other information, such as that indicated on FIG. 16, could be included in information box 1900.

The above example could be repeated for other elements of storage infrastructure 110. The GUI operator could have selected storage interfaces 103, and made additional selections until information for specific product in storage interfaces 103 is provided. For example, GUI 1700 could be used to obtain product information for a storage switch in storage interfaces 103. In a similar fashion, GUI 1700 could be used to obtain product information for a network link in communication network 120.

Storage Infrastructure Funding

Figure 21:
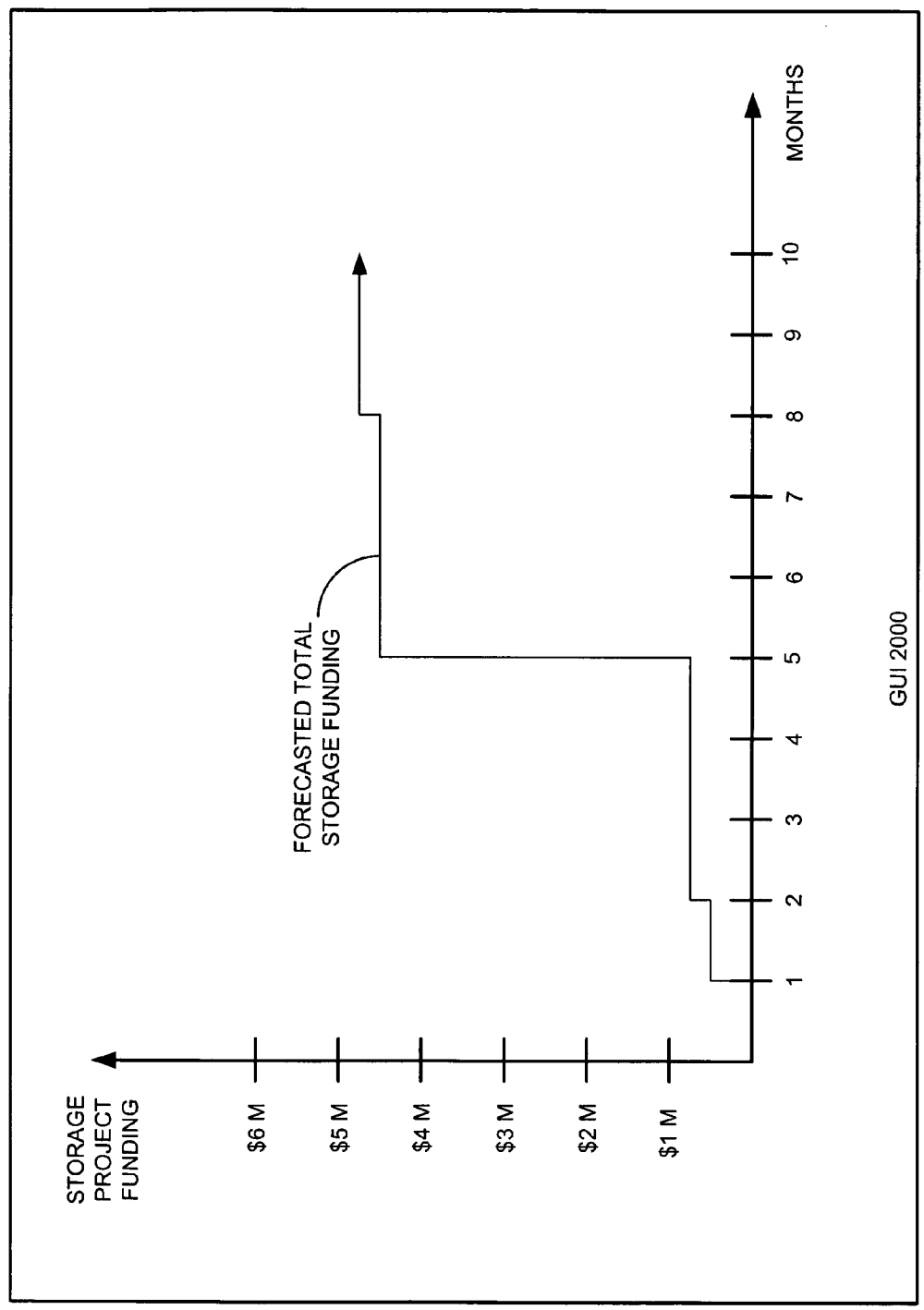
FIG. 21 illustrates a GUI for providing funding information for the storage infrastructure in an example of the invention.
Figure 22:
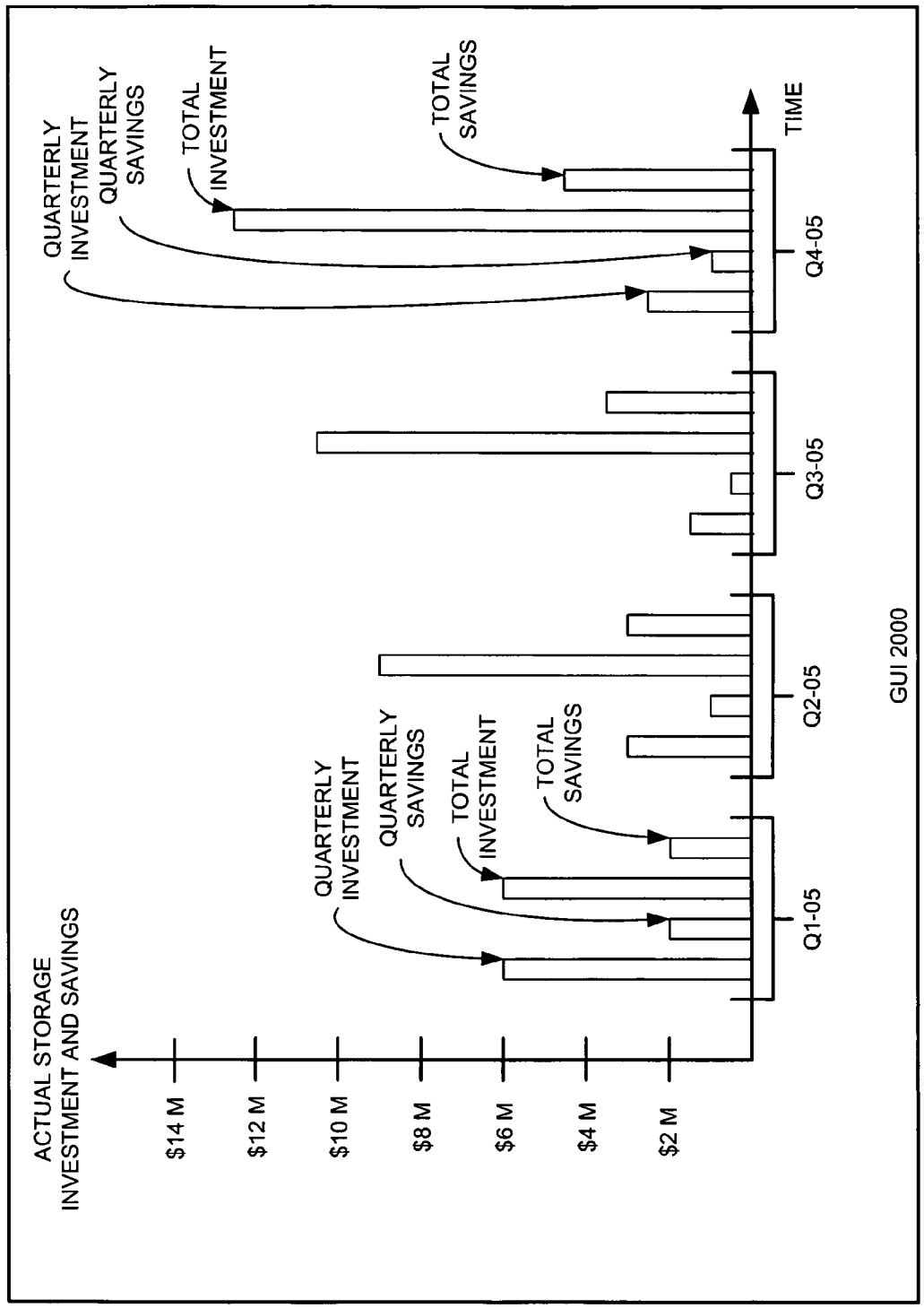
FIG. 22 illustrates a GUI for providing funding information for the storage infrastructure in an example of the invention.

Network management system 114 manages storage infrastructure funding in some examples of the invention. To accomplish this task, network management system 114 interacts with an operator through its GUI to provide project funding and scheduling information. FIGS. 20-22 illustrate GUI 2000 that is provided by network management system 114 to manage funding.

On FIG. 20, the left two columns of GUI 2000 lists various projects by ID and name. The third column lists the roll-out date for the project, where the roll-out date indicates when project funding must be available. The fourth column lists the total budget for each project. This project information could be entered by the operator or retrieved from other management systems.

Network management system 114 processes the project information to determine the preliminary storage budget for the project, savings provided by storage infrastructure 110, and a final storage budget. To determine this information, network management system 114 can apply various rules to the project data. For example, the preliminary storage budget could be a percentage of the total budget, where the percentage could be based on the total budget cost as follows.

| TOTAL BUDGET | STORAGE BUDGET PERCENTAGE |
|---|---|
| 0 to $500K | 20% |
| $500K to $1 M | 25% |
| $1 M to $3 M | 30% |
| $3 M to $5 M | 35% |
| $5 M to $10 M | 40% |

The preliminary storage budget would be the total budget multiplied by the appropriate percentage. Note that other techniques or factors could be used. For example, the percentages could be further broken down based on the type of project, the organization handling the project, or some other factor.

The savings provided by storage infrastructure 110 can be a percentage of the preliminary storage budget, where the percentage could be based on the preliminary storage budget as follows.

| PRELIMINARY STORAGE BUDGET | SAVINGS PERCENTAGE |
|---|---|
| 0 to $500K | 5% |
| $500K to $1 M | 10% |
| $1 M to $3 M | 15% |
| $3 M to $5 M | 20% |
| $5 M to $10 M | 25% |

The storage savings would be the preliminary storage budget multiplied by the appropriate percentage. Note that other techniques or factors could be used. For example, the percentages could be further broken down based on the type of project, the organization handling the project, or some other factor. The final storage budget is the preliminary storage budget less the savings.

Note that the budget numbers could be further broken down into subject matter buckets. For example, the final storage budget for a project could be separated into a hardware budget, software budget, and services budget by using a rule set. For example, the final storage budget could be allocated as follows: 60% of the final storage budget is for hardware, 20% is for software, and 20% is for services.

FIG. 21 shows another version of GUI 2000. GUI 2000 now provides a future forecast of storage funding based on the data of FIG. 20. On FIG. 21, the vertical axis represents storage funding and the horizontal axis represents time from the present in months. The final storage budget for each project is added to the total storage budget as of the roll-out date. In this example, the present time for GUI 2000 is Jan. 1, 2006 so the $450 K final storage budget for project X1 appears after the first month. The $1M final storage budget for project X3 and the $2.4 M final storage budget for projects X3 and X4 appear after the fifth month.

FIG. 22 shows another version of GUI 2000. GUI 2000 now provides a graph of actual storage investment and savings based on actual spending and savings data. The actual numbers could be retrieved from an accounting system. On FIG. 22, the vertical axis represents monetary amounts for actual storage investment and savings. The horizontal axis represents time periods in the past broken down by quarter, although other time periods such as months could be used. For each quarter, bar graphs indicate investment in the quarter, savings in the quarter, total investment for the specified period, and total savings for the specified period. From FIG. 22, it can be seen that the total investment and savings bars grow at the rate of quarterly investment and savings.

The operator may select which version of GUI 2000 (FIG. 21, 22, or 23) to view through the use of selection buttons, page tabs, or some other GUI technique. Advantageously, the operator is automatically provided with a financial picture of the storage infrastructure that indicates past, present, and future investment and savings. This information is of critical importance when making decisions on funding and timing of new storage projects and when evaluating existing projects.

Application Status and Implementation Information

Network management system 114 manages storage infrastructure application status in some examples of the invention. To accomplish this task, network management system 114 interacts with an operator through its GUI to provide application status and implementation information.

Figure 23:
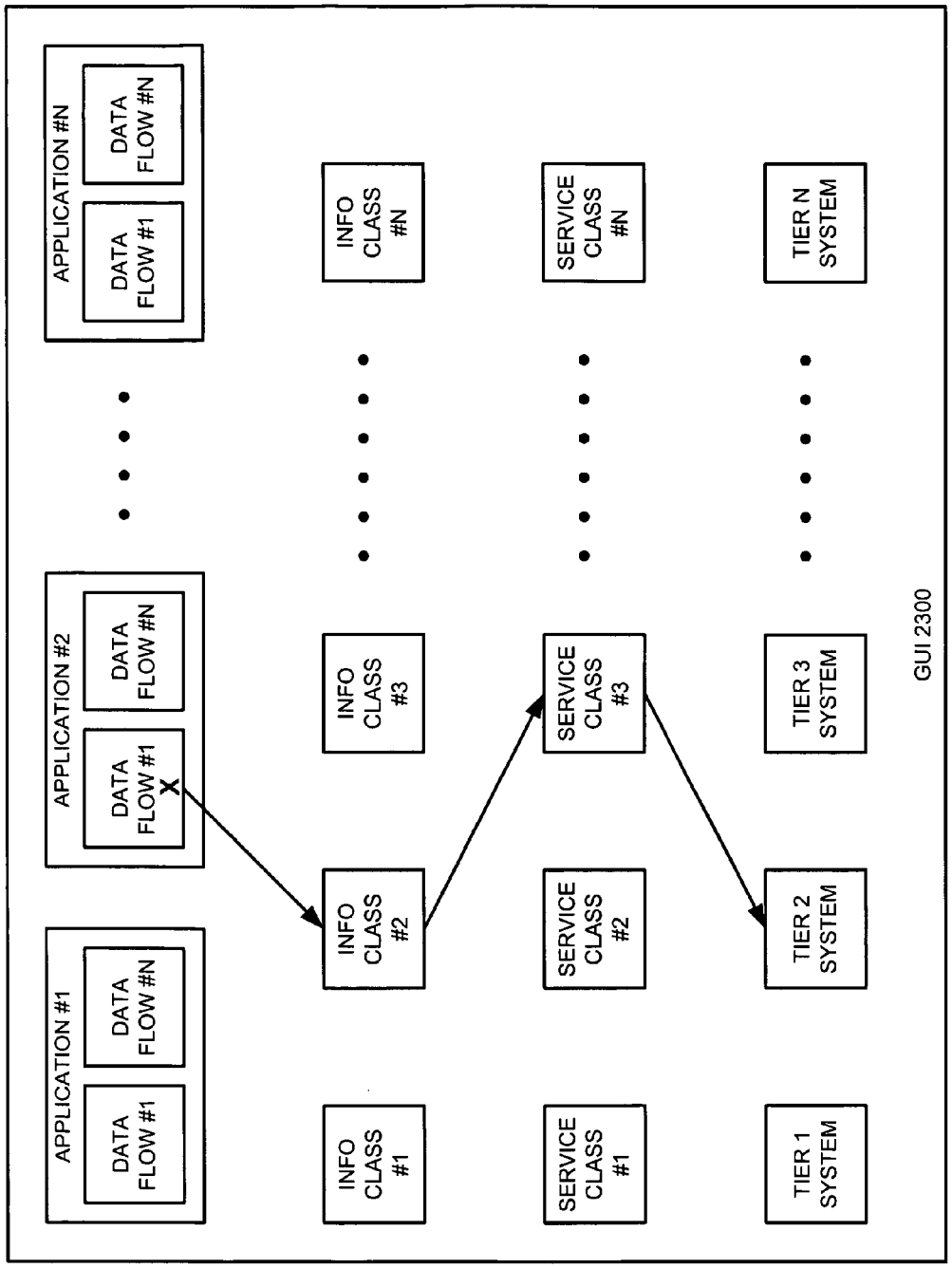
FIG. 23 illustrates a GUI for providing application assignment information in an example of the invention.

FIG. 23 illustrates GUI 2300 that is provided by network management system 114 to manage application status. On FIG. 23, various applications 1-N and their respective data flows 1-N are shown at the top of GUI 2300. The various information classes, service classes, and storage system tiers are shown under the applications on GUI 2300. In response to the selection of a specific data flow for a given application, GUI 2300 graphically illustrates the information class, service class, and storage tier for the selected data flow.

For example on FIG. 23, the operator has selected data flow #1 of application #2 on GUI 2300 as indicated by the "X" mark. In response to the selection, GUI 2300 uses arrows to illustrate that the selected data flow has been assigned to information class #2, service class #3, and storage tier #2. Note that color coding or other graphical techniques could be used to simultaneously illustrate these assignments for multiple data flows.

Figure 24:
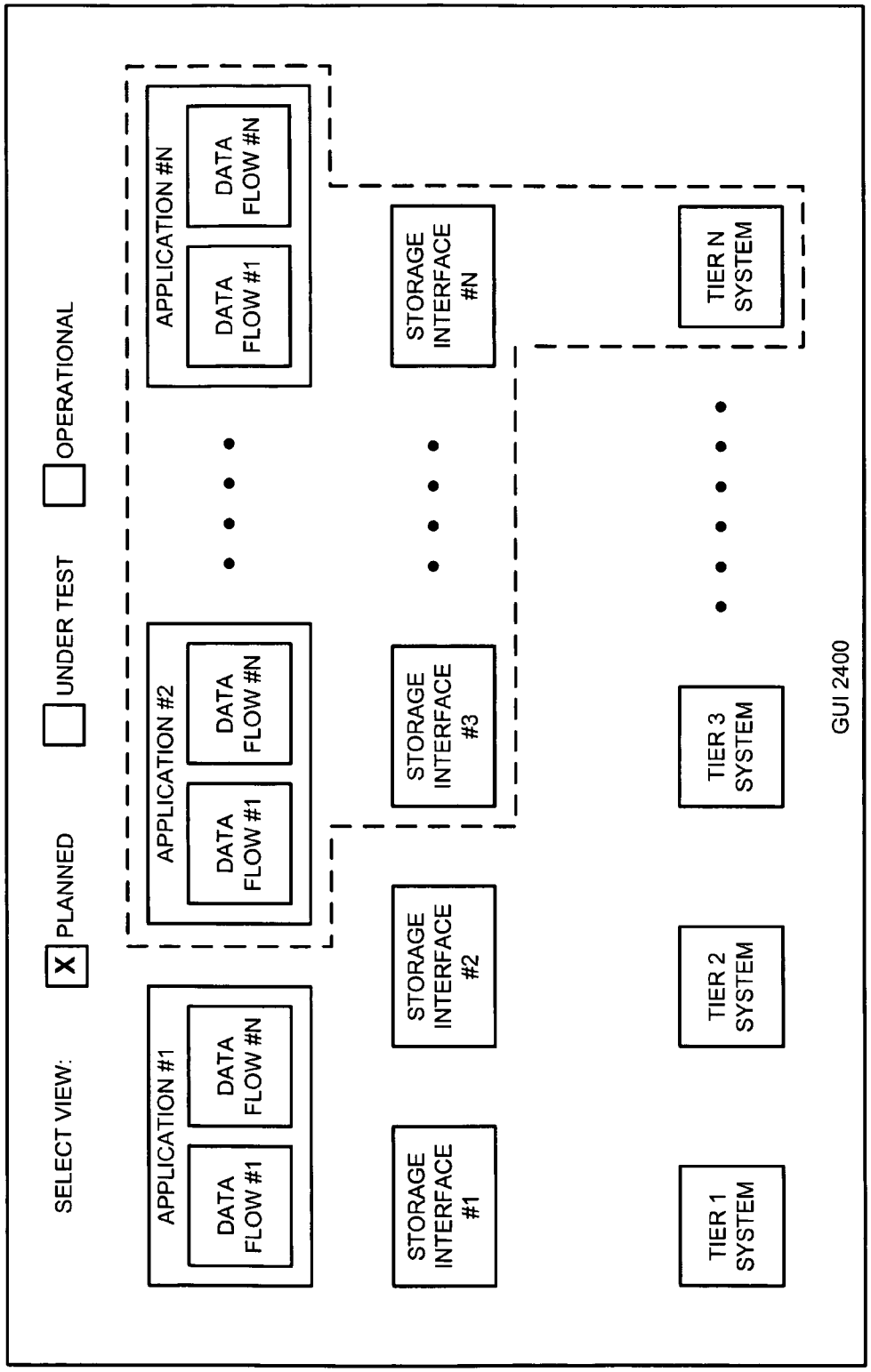
FIG. 24 illustrates a GUI for providing status and implementation information for applications and systems in an example of the invention.
Figure 25:
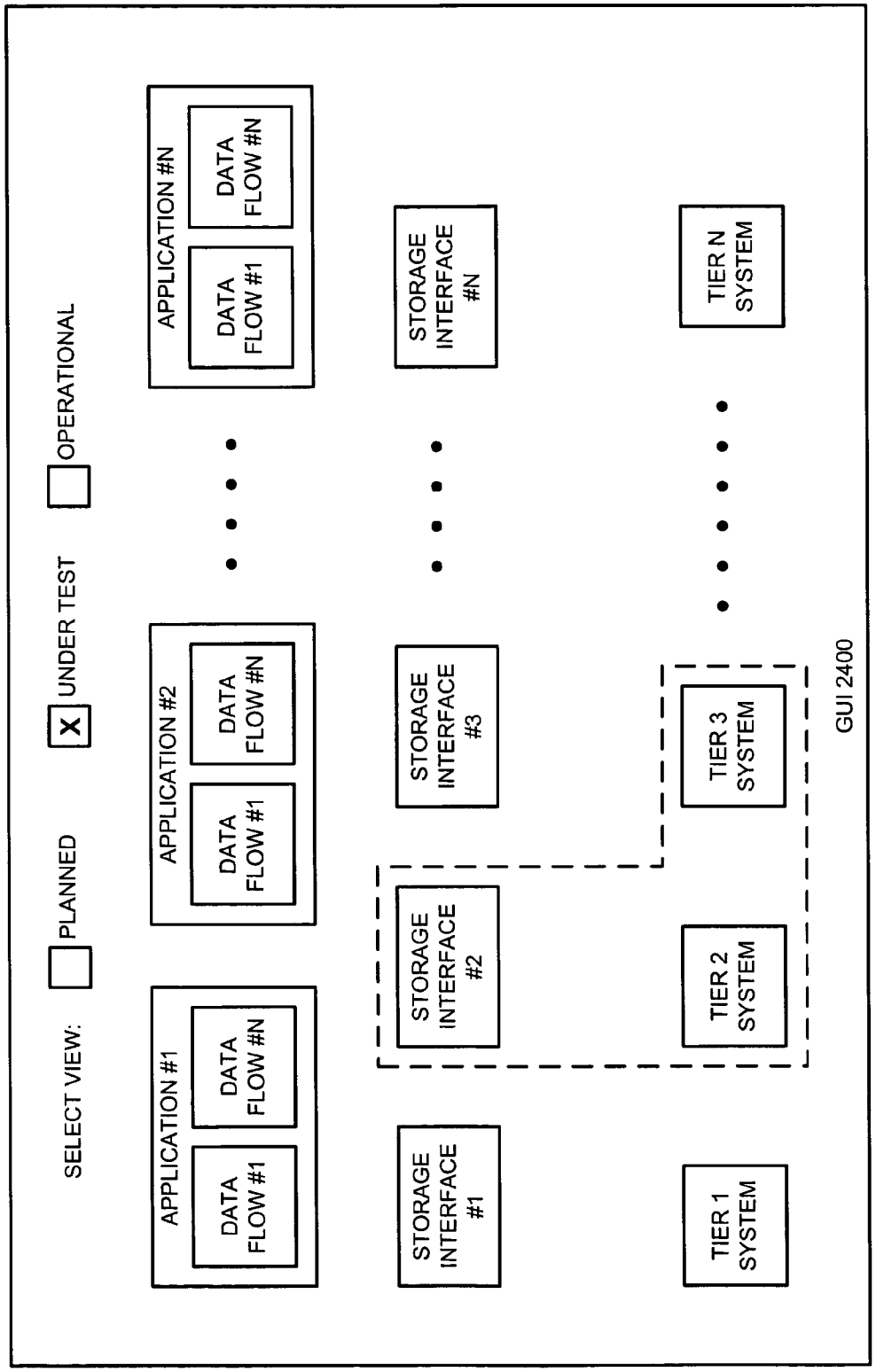
FIG. 25 illustrates a GUI for providing status and implementation information for applications and systems in an example of the invention.
Figure 26:
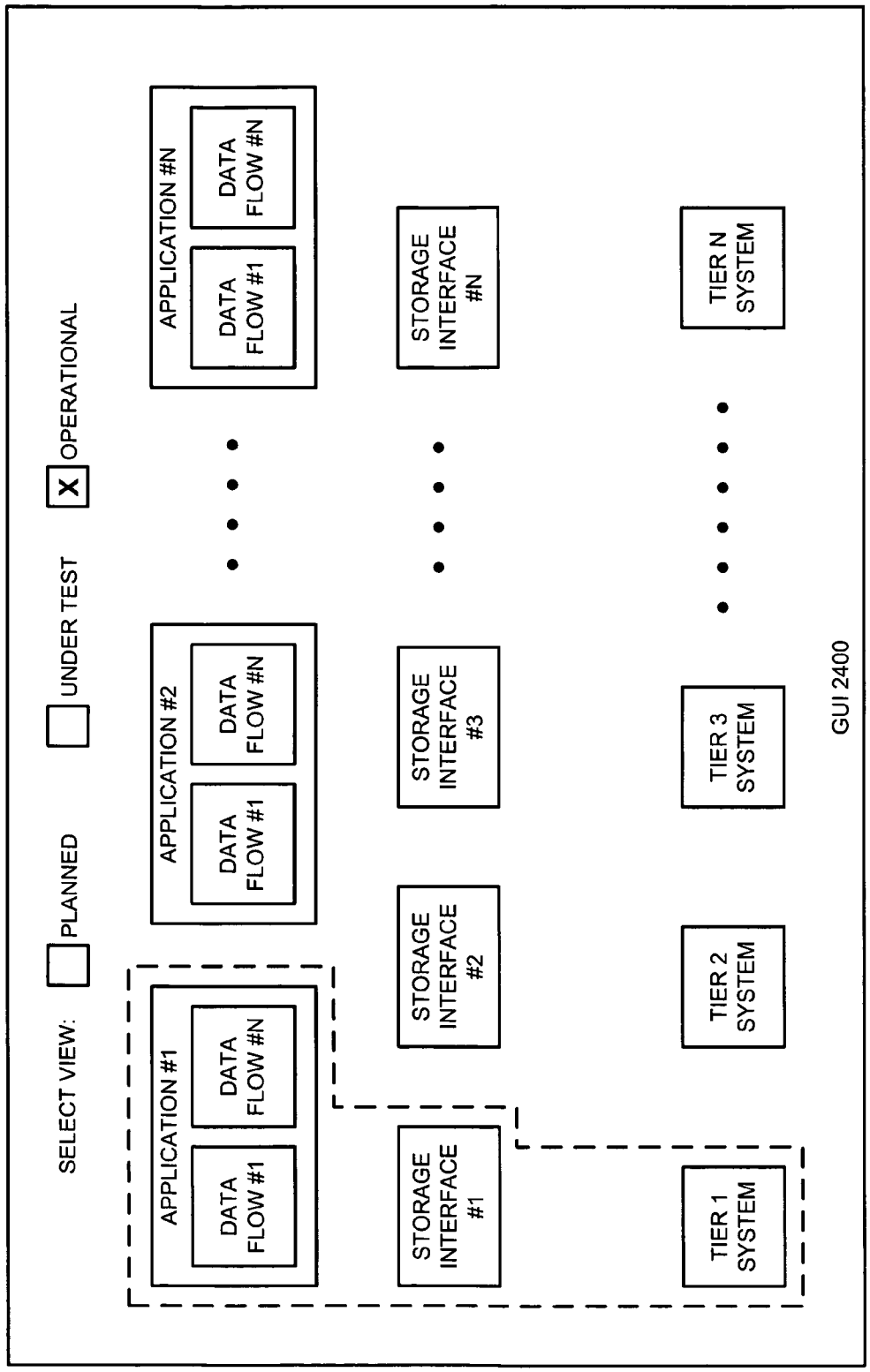
FIG. 26 illustrates a GUI for providing status and implementation information for applications and systems in an example of the invention.

FIGS. 24-26 illustrates GUI 2400 that is provided by network management system 114 to manage application implementation information. On FIGS. 24-26, various applications 1-N and their respective data flows 1-N are shown at the top of GUI 2400. The various storage interfaces and storage tiers are shown under the applications on GUI 2400. The top of GUI 2400 also has selection buttons for various views that show the various stages of implementation. The views are for planned implementations, implementations under test, and operational implementations.

In response to the selection of planned implementations (as indicated by the "X" mark on FIG. 24), GUI 2400 graphically illustrates the applications, data flows, storage interfaces and storage tiers that are planned but not yet tested or operational. In this example, a dashed line is used to indicate that applications 2-N (and their data flows), storage interfaces 3-N, and storage tier N are planned but not yet tested or operational.

In response to the selection of implementations under test (as indicated by the "X" mark on FIG. 25), GUI 2400 graphically illustrates the applications, data flows, storage interfaces, and storage tiers that are under test but not yet operational. In this example, a dashed line is used to indicate that storage interface 2 and storage tiers 2-3 are currently under test.

In response to the selection of operational implementations (as indicated by the "X" mark on FIG. 26), GUI 2400 graphically illustrates the applications, data flows, storage interfaces and storage tiers that are operational meaning that planning and testing is complete. In this example, a dashed line is used to indicate that application #1, storage interface #1, and storage tier #1 are currently operational. Note that color coding or other graphical techniques could be used to simultaneously illustrate the implementations that are planned, under test, and operational.

Network management system 114 could retrieve the current status of the various applications and systems from another system, or the operator could enter the status for each application and system. Advantageously, network management system 114 enables the GUI operator to obtain a quick but effective view of the planning and development of storage infrastructure 110.

Storage Management System

FIGS. 1-26 and the preceding text have described storage management system 114 that manages storage infrastructure 110 in communication network 100. Storage management system 114 assigns individual data flows to individual storage systems 111-113 based on a rigorous and robust analysis. Storage management system 114 also displays data storage infrastructure 110 and various related information. Storage management system 114 displays infrastructure models, implementation status, and funding status for data storage infrastructure 110. The models include a cost model, an employee model, and an inventory model. The implementation status indicates if systems in data storage infrastructure 110 are planned, under test, or operational. The funding status indicates actual past funding and forecasted future funding. Storage management system 114 also determines gaps between the current storage infrastructure and a target storage infrastructure. The gaps include a personnel gap, a hardware gap, and a software gap.

Advantageously, storage management system 114 provides a powerful management tool for storage infrastructures in communication networks. Storage management system 114 tracks and models current infrastructure status, identifies gaps for infrastructure growth, analyzes infrastructure funding, and assigns new data flows to the proper storage system and service level. Thus, storage management system 114 provides a comprehensive set of capabilities that address numerous problems facing communication networks that require complex storage infrastructures.

We claim:

1. A data storage infrastructure for a communication network that produces a plurality of data flows of network data, the data storage infrastructure comprising:

a plurality of data storage systems configured to store the network data using a plurality of data storage service classes, wherein different ones of the data storage systems provide different ones of the data storage service classes, and wherein one of the data storage service classes requires geographically diverse back-up storage; and a storage management system configured to process characteristics for the data flows to assign individual ones of the data flows to individual ones of the data storage systems, wherein the storage management system, to process the characteristics for the data flows to assign the individual ones of the data flows to the individual ones of the data storage systems, calculates a total score for each of the data flows based on a plurality of scored factors associated with each of the data flows, identifies key variables for each of the data flows, selects a service class from the data storage service classes for each of the data flows based on the total score and the key variables, and selects a storage system tier for each of the data flows based on the selected service class.

2. The data storage infrastructure of claim 1 wherein the different ones of the data storage service classes have different data storage reliabilities.

3. The data storage infrastructure of claim 1 wherein the characteristics indicate functions and inter-dependencies of the data flows.

4. The data storage infrastructure of claim 1 wherein the characteristics indicate users of the data flows.

5. The data storage infrastructure of claim 1 wherein the characteristics indicate monetary values of the data flows.

6. The data storage infrastructure of claim 1 wherein the characteristics indicate priorities of the data flows.

7. The data storage infrastructure of claim 1 wherein the characteristics indicate life-cycles of the data flows.

8. The data storage infrastructure of claim 1 wherein the characteristics indicate legal compliance requirements of the data flows.

9. The data storage infrastructure of claim 1 wherein the characteristics indicate performance requirements of the data flows.

10. The data storage infrastructure of claim 1 wherein the characteristics indicate performance requirements of the data flows.

11. A method of operating a data storage infrastructure for a communication network that produces a plurality of data flows of network data, the method comprising:

in a plurality of data storage systems, storing the network data using a plurality of data storage service classes, wherein different ones of the data storage systems provide different ones of the data storage service classes, and wherein one of the data storage service classes requires geographically diverse back-up storage; and in a storage management system, processing characteristics for the data flows to assign individual ones of the data flows to individual ones of the data storage systems, wherein processing the characteristics for the data flows to assign the individual ones of the data flows to the individual ones of the data storage systems comprises calculating a total score for each of the data flows based on a plurality of scored factors associated with each of the data flows, identifying key variables for each of the data flows, selecting a service class from the data storage service classes for each of the data flows based on the total score and the key variables, and selecting a storage system tier for each of the data flows based on the selected service class.

12. The method of claim 11 wherein the different ones of the data storage service classes have different data storage reliabilities.

13. The method of claim 11 wherein the characteristics indicate functions and inter-dependencies of the data flows.

14. The method of claim 11 wherein the characteristics indicate users of the data flows.

15. The method of claim 11 wherein the characteristics indicate monetary values of the data flows.

16. The method of claim 11 wherein the characteristics indicate priorities of the data flows.

17. The method of claim 11 wherein the characteristics indicate life-cycles of the data flows.

18. The method of claim 11 wherein the characteristics indicate legal compliance requirements of the data flows.

19. The method of claim 11 wherein the characteristics indicate performance requirements of the data flows.

20. The method of claim 11 wherein the characteristics indicate performance requirements of the data flows.

* * * * *